(12) United States Patent
Takahashi et al.

(10) Patent No.: US 10,531,002 B2
(45) Date of Patent: Jan. 7, 2020

(54) IMAGE PROCESSING DEVICE AND IMAGE PROCESSING METHOD

(71) Applicant: SONY SEMICONDUCTOR SOLUTIONS CORPORATION, Kanagawa (JP)

(72) Inventors: Hiroaki Takahashi, Tokyo (JP); Yasunobu Hitomi, Kanagawa (JP); Kentaro Okamura, Kanagawa (JP); Masayuki Tachi, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 15/761,393

(22) PCT Filed: Sep. 16, 2016

(86) PCT No.: PCT/JP2016/077404
§ 371 (c)(1),
(2) Date: Mar. 19, 2018

(87) PCT Pub. No.: WO2017/057048
PCT Pub. Date: Apr. 6, 2017

(65) Prior Publication Data
US 2018/0278822 A1    Sep. 27, 2018

(30) Foreign Application Priority Data

Oct. 2, 2015  (JP) .................... 2015-197210

(51) Int. Cl.
*H04N 5/232*  (2006.01)
*G03B 15/00*  (2006.01)
(Continued)

(52) U.S. Cl.
CPC ........... *H04N 5/2327* (2013.01); *G03B 15/00* (2013.01); *H04N 5/217* (2013.01); *H04N 5/2258* (2013.01);
(Continued)

(58) Field of Classification Search
CPC .... H04N 5/2327; H04N 5/243; H04N 5/2353; H04N 5/23232; H04N 5/347;
(Continued)

(56) References Cited

U.S. PATENT DOCUMENTS

| 6,529,640 | B1 | 3/2003 | Utagawa et al. |
| 2001/0028399 | A1* | 10/2001 | Conley ............... H04N 5/262 348/239 |
| 2004/0263628 | A1 | 12/2004 | Ambiru et al. |
| 2011/0310219 | A1* | 12/2011 | Kim ............... G08B 13/19643 348/36 |

(Continued)

FOREIGN PATENT DOCUMENTS

| CN | 1578405 A | 2/2005 |
| JP | 04-024620 A | 1/1992 |

(Continued)

OTHER PUBLICATIONS

International Search Report and Written Opinion of PCT Application No. PCT/JP2016/077404, dated Nov. 8, 2016, 09 pages.

*Primary Examiner* — Gevell V Selby
(74) *Attorney, Agent, or Firm* — Chip Law Group

(57) ABSTRACT

The present disclosure relates to an image processing device and an image processing method capable of generating a high-quality composite image. Exposure time and exposure timing of a basic imaging unit which images a basic image and a plurality of auxiliary imaging units which may image under an imaging condition independent from that of the basic imaging unit are controlled according to a motion amount. The present disclosure is applicable to an image processing device.

18 Claims, 17 Drawing Sheets

(51) Int. Cl.
*H04N 5/247* (2006.01)
*H04N 5/217* (2011.01)
*H04N 5/225* (2006.01)
*H04N 5/235* (2006.01)
*H04N 5/243* (2006.01)
*H04N 5/347* (2011.01)
*G03B 19/02* (2006.01)

(52) U.S. Cl.
CPC ....... *H04N 5/2353* (2013.01); *H04N 5/23222* (2013.01); *H04N 5/23232* (2013.01); *H04N 5/23258* (2013.01); *H04N 5/243* (2013.01); *H04N 5/247* (2013.01); *H04N 5/347* (2013.01); *G03B 19/026* (2013.01); *G03B 2206/00* (2013.01); *G03B 2207/005* (2013.01)

(58) Field of Classification Search
CPC ...... H04N 5/217; H04N 5/2258; H04N 5/247; H04N 5/23258; H04N 5/23222; G03B 15/00; G03B 19/026; G03B 2207/005; G03B 2206/00
See application file for complete search history.

(56) References Cited

U.S. PATENT DOCUMENTS

| | | | |
|---|---|---|---|
| 2012/0314089 A1* | 12/2012 | Chang | H04N 5/247 348/194 |
| 2014/0146185 A1* | 5/2014 | Kannermark | H04N 17/002 348/187 |
| 2016/0165137 A1* | 6/2016 | Kang | G02B 27/646 348/208.4 |
| 2017/0352136 A1* | 12/2017 | Uliyar | H04N 5/353 |

FOREIGN PATENT DOCUMENTS

| | | |
|---|---|---|
| JP | 08-110541 A | 4/1996 |
| JP | 2000-078463 A | 3/2000 |
| JP | 2001-346093 A | 12/2001 |
| JP | 2003-018445 A | 1/2003 |
| JP | 2004-222183 A | 8/2004 |
| JP | 2005-020565 A | 1/2005 |
| JP | 2006-106489 A | 4/2006 |
| JP | 2010-230879 A | 10/2010 |
| JP | 2011-035556 A | 2/2011 |
| JP | 2012-044443 A | 3/2012 |

* cited by examiner

IMAGE PROCESSING DEVICE AND IMAGE PROCESSING METHOD

CROSS REFERENCE TO RELATED APPLICATIONS

This application is a U.S. National Phase of International Patent Application No. PCT/JP2016/077404 filed on Sep. 16, 2016, which claims priority benefit of Japanese Patent Application No. JP 2015-197210 filed in the Japan Patent Office on Oct. 2, 2015. Each of the above-referenced applications is hereby incorporated herein by reference in its entirety.

TECHNICAL FIELD

The present disclosure relates to an image processing device, an image processing method, and a program, and especially relates to an image processing device, an image processing method, and a program capable of generating a high-quality composite image while reducing an effect of blurring in long-time exposure.

BACKGROUND ART

Various technologies are proposed for obtaining high-quality images using a plurality of imaging devices.

For example, a charge coupled device (CCD) or a complementary metal oxide semiconductor (CMOS) image sensor generates a pixel signal by measuring an amount of electric charge generated by a photoelectric effect on a sensor surface as its principle; as an area of a light receiving unit is enlarged, sensitivity may be improved.

Therefore, a technology of improving the sensitivity by using a large area pixel is proposed (refer to, for example, Patent Documents 1 and 2).

Also, a technology of generating a high-quality image using an image of short-time exposure with little blurring and an image of long-time exposure with less noise by using images with different exposure times is proposed (for example, refer to Patent Document 3).

Furthermore, in order to reduce an effect by blurring, a technology of detecting motion and controlling exposure is proposed (for example, refer to Patent Document 4).

CITATION LIST

Patent Document

Patent Document 1: Japanese Patent Application Laid-Open No. 2003-018445
Patent Document 2: Japanese Patent Application Laid-Open No. 2012-044443
Patent Document 3: Japanese Patent Application Laid-Open No. 2001-346093
Patent Document 4: Japanese Patent Application Laid-Open No. 04-024620

SUMMARY OF THE INVENTION

Problems to be Solved by the Invention

However, in the technologies in Patent Documents 1 and 2, the sensor size becomes large in order to obtain the same spatial resolution with the large area pixel, and there is a fear that the size of a system also increases and a cost becomes high. On the other hand, in a case where the sensor size is limited to be equivalent to the conventional size, there is a fear that the spatial resolution decreases and an angle of view decreases.

Also, in the technology in Patent Document 3, it is possible to increase a signal to noise ratio (SNR) improvement rate by extending the exposure time of the long-time exposure image, but there is a fear that extending the exposure time also enlarges deviation between images due to camera shake, motion blurring and the like, and as a result, the images cannot be composited well to be deteriorated as compared with the image with the small exposure time ratio.

Furthermore, in the technology in Patent Document 4, since noise might be increased by short-time exposure which is not appropriate while suppressing blurring, so that in a configuration including a single imaging device, as a result of consideration of trade-off between blurring and noise, setting must be moderate and a sufficiently high image quality cannot be realized.

The present disclosure is achieved in view of such a situation, and especially, an object thereof is to generate a high-quality composite image while reducing an effect of blurring in the long-time exposure.

Solutions to Problems

An image processing device according to an aspect of the present disclosure is an image processing device including a first imaging unit which captures an image, a plurality of second imaging units capable of setting an imaging condition independent from the imaging condition of the first imaging unit, a motion detection unit which detects a motion amount, and an imaging control unit which determines the imaging condition of the first imaging unit and the imaging condition of the plurality of second imaging units, in which the imaging control unit determines the imaging condition of the first imaging unit and the imaging condition of the plurality of second imaging units according to the motion amount detected by the motion detection unit.

The first imaging unit and the plurality of second imaging units may have configurations of image sensors and optical systems independent from each other or the configurations obtained by dividing the same optical system and pixels on the same image sensor into two or more groups.

The first imaging unit and the plurality of second imaging units may have different characteristics.

The first imaging unit and the plurality of second imaging units may have different characteristics in at least any one of array of a color filter array, an optical lens characteristic, a pixel size, and a sensor size.

Exposure time which is the imaging condition of the first imaging unit may be longest exposure time set on the basis of the motion amount and a motion limit threshold determined in advance.

The exposure time which is the imaging condition of the first imaging unit may be terminated at a timing at which the motion amount becomes larger than the motion limit threshold within the longest exposure time.

The imaging condition of the second imaging units may be such that, in a case of capturing a still image, an exposure start timing is made the same as the exposure start timing in the first imaging unit, or an exposure finish timing is made the same as the exposure finish timing in the first imaging unit.

Exposure time out of the imaging condition of the second imaging units may be longest exposure time set on the basis of the motion amount and a motion limit threshold determined in advance.

The exposure time which is the imaging condition of the second imaging units may be terminated at a timing at which the motion amount becomes larger than the motion limit threshold within the longest exposure time.

The exposure time out of the imaging condition of the second imaging units may be the exposure time set on the basis of an exposure time ratio with the exposure time in the first imaging unit in the longest exposure time.

Exposure time out of the imaging condition of the second imaging units may be such that longest exposure time is recalculated according to the exposure time until the exposure time is terminated in a case where the exposure time is terminated at a timing at which the motion amount becomes larger than a motion limit threshold within the longest exposure time set on the basis of the motion amount and the motion limit threshold determined in advance.

The imaging condition of the second imaging units may be a pixel addition mode in which pixel values of a plurality of surrounding pixels are added to be handled for each pixel in a case where appropriate exposure cannot be obtained with predetermined exposure time.

The motion detection unit may detect a motion amount of a camera by obtaining an angular or translational displacement amount by integrating angular velocity or acceleration information detected by a motion sensor including a gyro sensor or a six-axis sensor.

The motion detection unit may detect motion of the first imaging unit or the second imaging units or motion in accordance with motion of a subject in an image from two or more images captured by the first imaging unit or the second imaging units at different timings.

A composition unit which composites an image captured by the first imaging unit and images captured by the plurality of second imaging units to generate a composite image may be further included.

An image processing method according to an aspect of the present disclosure is an image processing method of an image processing device including a first imaging unit which captures an image, a plurality of second imaging units capable of setting an imaging condition independent from the imaging condition of the first imaging unit, a motion detection unit which detects a motion amount, and an imaging control unit which determines the imaging condition of the first imaging unit and the imaging condition of the plurality of second imaging units, in which the imaging control unit determines the imaging condition of the first imaging unit and the imaging condition of the plurality of second imaging units according to the motion amount detected by the motion detection unit.

A program according to an aspect of the present disclosure is a program allowing a computer to serve as a first imaging unit which captures an image, a plurality of second imaging units capable of setting an imaging condition independent from the imaging condition of the first imaging unit, a motion detection unit which detects a motion amount, and an imaging control unit which determines the imaging condition of the first imaging unit and the imaging condition of the plurality of second imaging units, in which the imaging control unit determines the imaging condition of the first imaging unit and the imaging condition of the plurality of second imaging units according to the motion amount detected by the motion detection unit.

According to an aspect of the present disclosure, an image is captured by a first imaging unit, an imaging condition independent from that of the first imaging unit is set by a plurality of second imaging units, a motion amount is detected by the motion detection unit, the imaging conditions of the first imaging unit and the plurality of second imaging units are determined by an imaging control unit, and the imaging conditions of the first imaging unit and the plurality of second imaging units are determined by the imaging control unit according to the motion amount detected by the motion detection unit.

Effects of the Invention

According to an aspect of the present disclosure, it is possible to generate a high-quality composite image while reducing the effect of blurring in long-time exposure.

MODE FOR CARRYING OUT THE INVENTION

Preferred embodiments of the present disclosure are hereinafter described in detail with reference to the accompanying drawings. Meanwhile, in the present specification and the drawings, the same reference sign is assigned to components having substantially the same functional configuration, and the description thereof is not repeated.

Also, the description is given in the following order.
1. First Embodiment
2. Second Embodiment
3. Third Embodiment
4. Fourth Embodiment
5. Fifth Embodiment
6. Application 1. First Embodiment <Configuration Example of First Embodiment of Image Processing Device>

Figure 1:
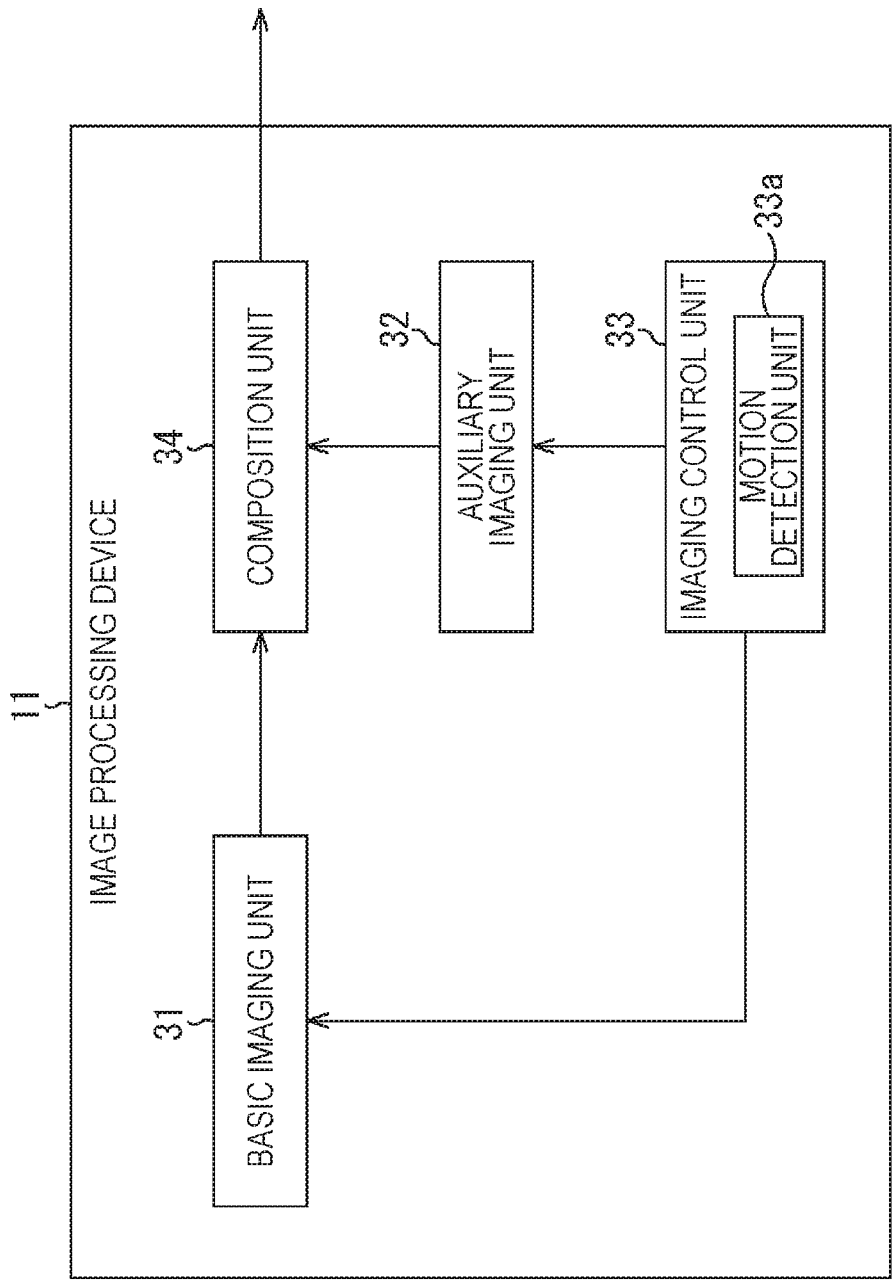
FIG. 1 is a view illustrating a configuration example of a first embodiment of an image processing device to which the present disclosure is applied.

FIG. 1 is a block diagram illustrating a configuration example of a first embodiment of an image processing device to which the present disclosure is applied. An image processing device 11 in FIG. 1 captures a plurality of images with different exposure times and composites a high-sensitivity image.

In more detail, the image processing device 11 is provided with a basic imaging unit 31, an auxiliary imaging unit 32, an imaging control unit 33, and a composition unit 34.

The basic imaging unit 31 and the auxiliary imaging unit 32 image substantially the same range in the substantially same direction on the substantially same plane; they capture a basic image and an auxiliary image, respectively. The basic imaging unit 31 and the auxiliary imaging unit 32 are not necessarily the same regarding array of a color filter array (presence or absence of an infrared (IR) cut filter), an optical lens characteristic (focal length, F value, and modulation transfer function (MTF)), a pixel size, and a sensor size.

Each of the basic imaging unit 31 and the auxiliary imaging unit 32 including an optical block such as a lens and an imaging element such as a CCD and a CMOS captures an image in accordance with a setting by the imaging control unit 33 and supplies the same to the composition unit 34. In more detail, the basic imaging unit 31 and the auxiliary imaging unit 32 operate on the basis of a control signal from the imaging control unit 33 in order to synchronize with each other.

That is, the basic imaging unit 31 and the auxiliary imaging unit 32 reflect the setting from the imaging control unit 33, start exposure upon reception of an exposure start signal, monitor a terminating signal until a longest exposure time elapses, continues the exposure until when the terminating signal is received or until time set as the longest exposure time, and finishes the exposure to start reading when the terminating signal is received or when the longest exposure time elapses.

Meanwhile, for simplicity, it is described assuming that there is one basic imaging unit 31 and one auxiliary imaging unit 32, but the number thereof is not limited as long as this is one or larger, and, for example, it is also possible to divide pixels on an image sensor of one auxiliary imaging unit 32 into a plurality of individually controllable groups and form them as the basic imaging unit 31 and the auxiliary imaging unit 32.

Also, although the basic imaging unit 31, the auxiliary imaging unit 32, and the imaging control unit 33 are configured separately, for example, any one of the basic imaging unit 31 and the auxiliary imaging unit 32 may manage synchronization with the other imaging unit.

The imaging control unit 33 controls imaging of the basic imaging unit 31 and the auxiliary imaging unit 32, and is provided with a motion detection unit 33a to detect motion of an entire image processing device 11.

The imaging control unit 33 controls the basic imaging unit 31 regarding the setting of various parameters required for imaging (hereinafter referred to as imaging parameters) and the (longest) exposure time, an analog gain, and on/off of a pixel addition mode. Meanwhile, the imaging control unit 33 determines the imaging parameters from a characteristic of the basic imaging unit 31, subject illuminance and the like using a conventional auto exposure (AE) method. At that time, in order to prevent large blurring, the exposure time is preferably set to be short; for example, this may be set to 1/focal length obtained by an optical system [s] or to a maximum value not exceeding a limit value of the number of blur allowable pixels determined in advance by using the number of blur pixels per unit time obtained from an angular velocity estimated from the motion before the exposure, a field of view (FOV), and sensor resolution.

Also, in a case where there is a large deviation between appropriate exposure calculated from the subject illuminance and an exposure set value based on a set value, the imaging control unit 33 may turn on the pixel addition mode to set to capture a brighter image. There are roughly two types of pixel addition: analog addition (addition before analog to digital (AD) conversion) and digital addition (addition after AD conversion).

The pixel addition is herein intended to mean floating diffusion (FD) addition out of analog addition in a narrow sense, but this is not limited to the FD addition. An adding method which improves a signal to ratio (SNR) by the pixel addition is desirable.

Upon depression of a shutter button or completion of focus estimation, the imaging control unit 33 transmits the exposure start signal to the basic imaging unit 31. Also, the imaging control unit 33 obtains a blur amount during the exposure time by integrating the angular velocity, acceleration and the like during the exposure from an exposure start time, and when detecting that this exceeds the limit value of the number of blur allowable pixels determined in advance, transmits the exposure terminating signal to the basic imaging unit 31 to start reading the image.

The imaging control unit 33 controls the auxiliary imaging unit 32 regarding the setting of the imaging parameters and the (longest) exposure time, the analog gain, and on/off of the pixel addition mode. Also, the imaging control unit 33 may determine the exposure time and the value of the analog gain from a characteristic of the auxiliary imaging unit 32 and the subject illuminance using the conventional AE method.

Furthermore, the imaging control unit 33 may determine the value of the analog gain after determining the exposure time to any one of the exposure time of appropriate exposure with the analog gain of 0 dB from the conventional AE method, the exposure time which is a constant multiple of the exposure time of the basic imaging unit 31, the exposure time which is the longest value not exceeding the limit value of the number of blur allowable pixels determined in advance based on the number of blur pixels per unit time obtained from the angular velocity estimated from the motion before the exposure, the FOV, and the sensor resolution, and a minimum value of the above-described three types of exposure times.

In a case where the appropriate exposure cannot be realized with the analog gain in the (longest) exposure time obtained above, the imaging control unit 33 may further improve the SNR of a dark area by turning on the pixel addition, thereby creating a high-quality image.

As in the basic imaging system, the pixel addition is herein intended to mean the FD addition out of the analog addition in a narrow sense, but this is not limited to the FD addition and includes future novel technologies. An adding method which improves the SN by the pixel addition is desirable.

Upon the depression of the shutter button and the completion of the focus estimation, the imaging control unit 33 transmits the exposure start signal to the auxiliary imaging unit 32. Also, the imaging control unit 33 obtains the blur amount during the exposure time by integrating the angular velocity, the acceleration and the like during the exposure from the exposure start time, and when detecting that this exceeds the limit value of the number of blur allowable pixels determined in advance, transmits the exposure terminating signal to the auxiliary imaging unit 32 to start reading the image.

The motion detection unit 33a estimates a motion amount (angular velocity, angular acceleration, velocity, acceleration and the like) and detects the motion. However, it is also possible that the motion detection unit 33a determines an imaging condition only by the basic imaging unit 31, the auxiliary imaging unit 32, and the subject illuminance without estimating the motion amount in the above-described process.

The motion detection unit 33a including a sensor and the like which detects the motion such as a gyro sensor, an acceleration sensor, and a six-axis sensor, for example, integrates values of the angular velocity and the acceleration, thereby obtaining amounts of change in angle of a camera and translation.

Also, the motion detection unit 33a predicts the velocity and the angular velocity during the exposure time by measuring the motion from before the exposure starts, for example. More specifically, the motion detection unit 33a predicts the motion using an average value of the velocity and the angular velocity or a motion average in a fixed time period before the exposure starts, and the Kalman filter. Furthermore, the motion detection unit 33a updates an estimated value of the motion using immediately preceding information for each frame in a moving image.

In principle, the motion detection unit 33a sets the exposure start time as an initial value of the motion and calculates a displacement amount of the motion from the exposure start.

The composition unit 34 outputs a composite image generated by compositing the basic image captured by the basic imaging unit 31 and the auxiliary image captured by the auxiliary imaging unit 32. The composition unit 34 determines a process according to an object required for the composite image to be generated. For example, the composition unit 34 may aim to apply noise reduction (NR) or to deblur, or may aim to composite a high dynamic range (HDR) image, or may aim to perform super resolution processing.

In a case where the optical system and the imaging element of the basic imaging unit 31 are different from those of the auxiliary imaging unit 32, the composition unit 34 may process after making different characteristic amounts of the basic image and the auxiliary image the same or may process directly. Also, an existing method is used as a composition method of the composition unit 34.

<Regarding Image Composition Processing in Image Processing Device in FIG. 1>

Image composition processing by the image processing device 11 in FIG. 1 is next described with reference to a flowchart in FIG. 2.

At step S11, the imaging control unit 33 determines and sets the motion, the longest exposure time, the analog gain, and on/off of the pixel addition mode which serve as the imaging conditions of the basic imaging unit 31 and the auxiliary imaging unit 32.

In more detail, the imaging control unit 33 controls the motion detection unit 33a to estimate the motion amount. In FIG. 1, the motion detection unit 33a is configured to detect the motion by itself without obtaining external information, so that this includes the sensor and the like which detects the motion such as the gyro sensor, the acceleration sensor, for example, and the six-axis sensor, obtains the amounts of change in angle and translation of the basic imaging unit 31 and the auxiliary imaging unit 32 by integrating the values of the angular velocity and the acceleration, and cumulatively obtains the change as the motion, thereby estimating the motion at a next timing.

Also, the imaging control unit 33 determines the longest exposure time which is the exposure time when the exposure is not terminated halfway for each of the basic imaging unit 31 and the auxiliary imaging unit 32. Furthermore, the imaging control unit 33 sets the analog gain at the time of analogue to digital (AD) conversion in the image sensors of the basic imaging unit 31 and the auxiliary imaging unit 32. Also, the imaging control unit 33 sets on/off of the pixel addition mode.

At step S12, the imaging control unit 33 transmits the exposure start signal to the basic imaging unit 31 and the auxiliary imaging unit 32, and the basic imaging unit 31 and the auxiliary imaging unit 32 synchronously start the exposure.

At step S13, the imaging control unit 33 controls the motion detection unit 33a to start the exposure and calculate the motion amount. The motion amount calculated by the motion detection unit 33a is compared with a set threshold for each of the basic imaging unit 31 and the auxiliary imaging unit 32 and is used for determining termination.

At step S14, the imaging control unit 33 determines whether the exposure of the basic imaging unit 31 already finishes, and if not, the procedure shifts to step S15.

At step S15, the imaging control unit 33 determines whether the motion amount calculated by the motion detection unit 33a satisfies a condition for terminating the exposure of the basic imaging unit 31. In a case where the motion amount calculated by the motion detection unit 33a does not satisfy the condition for terminating the exposure of the basic imaging unit 31 at step S15, the procedure shifts to step S16.

At step S16, the imaging control unit 33 determines whether the exposure time of the basic imaging unit 31 reaches the longest exposure time. In a case where it is regarded that this does not reach the longest exposure time at step S16, the procedure returns to step S13. That is, in a period from when the exposure of the basic imaging unit 31 is started until the exposure time reaches the longest exposure time, the processes at steps S13 to S16 are repeated unless the motion amount satisfies the condition for terminating.

Then, in a case where it is regarded that the motion amount satisfies the condition for terminating the exposure of the basic imaging unit 31 at step S15, or in a case where the longest exposure time of the basic imaging unit 31 elapses at step S16, the procedure shifts to step S17.

At step S17, the imaging control unit 33 finishes the exposure in the basic imaging unit 31 and starts reading a pixel signal.

That is, in the basic imaging unit 31, when the motion amount satisfies the condition for terminating the exposure or the longest exposure time elapses after the exposure starts, the exposure finishes and the pixel signal is read.

At step S18, the imaging control unit 33 determines whether the exposure of the auxiliary imaging unit 32 is already terminated, and if not, the procedure shifts to step S19.

At step S19, the imaging control unit 33 determines whether the motion amount calculated by the motion detection unit 33*a* satisfies the condition for terminating the exposure of the auxiliary imaging unit 32. In a case where the motion amount calculated by the motion detection unit 33*a* does not satisfy the condition for terminating the exposure of the auxiliary imaging unit 32 at step S19, the procedure shifts to step S20.

At step S20, the imaging control unit 33 determines whether the exposure time of the auxiliary imaging unit 32 reaches the longest exposure time. In a case where it is regarded that this does not reach the longest exposure time at step S20, the procedure returns to step S13. That is, in the period from when the exposure of the basic imaging unit 31 is started until the exposure time reaches the longest exposure time, the processes at steps S13 to S20 are repeated unless the motion amount satisfies the condition for termination.

Then, in a case where it is regarded at step S19 that the motion amount satisfies the condition for terminating the exposure of the auxiliary imaging unit 32, or in a case where the longest exposure time of the auxiliary imaging unit 32 elapses at step S20, the procedure shifts to step S21.

At step S21, the imaging control unit 33 finishes the exposure in the auxiliary imaging unit 32 and starts reading the pixel signal.

That is, in the auxiliary imaging unit 32, when the motion amount satisfies the condition for terminating or the longest exposure time elapses after the exposure starts, the exposure finishes and the pixel signal is read.

At step S22, the imaging control unit 33 determines whether the images required for compositing an image, that is, the basic image and the auxiliary image are prepared, and if not, the procedure returns to step S13. That is, the processes at steps S13 to S22 are repeated until the images required for compositing are prepared. Then, at step S22, in a case where it is regarded that the images required for compositing are prepared, the procedure shifts to step S23.

At step S23, the composition unit 34 composites the basic image and the auxiliary image to generate a composite image and outputs the same.

Also, in a case where the auxiliary imaging unit 32 already finishes the exposure at step S18, the processes at steps S19 to S21 are skipped, and the procedure shifts to step S23.

That is, at step S18, for example, in a case where it is aimed to improve sensitivity, the exposure time of the auxiliary imaging unit 32 is longer, so that when the exposure of the auxiliary imaging unit 32 finishes, the composition is started immediately.

Figure 3:
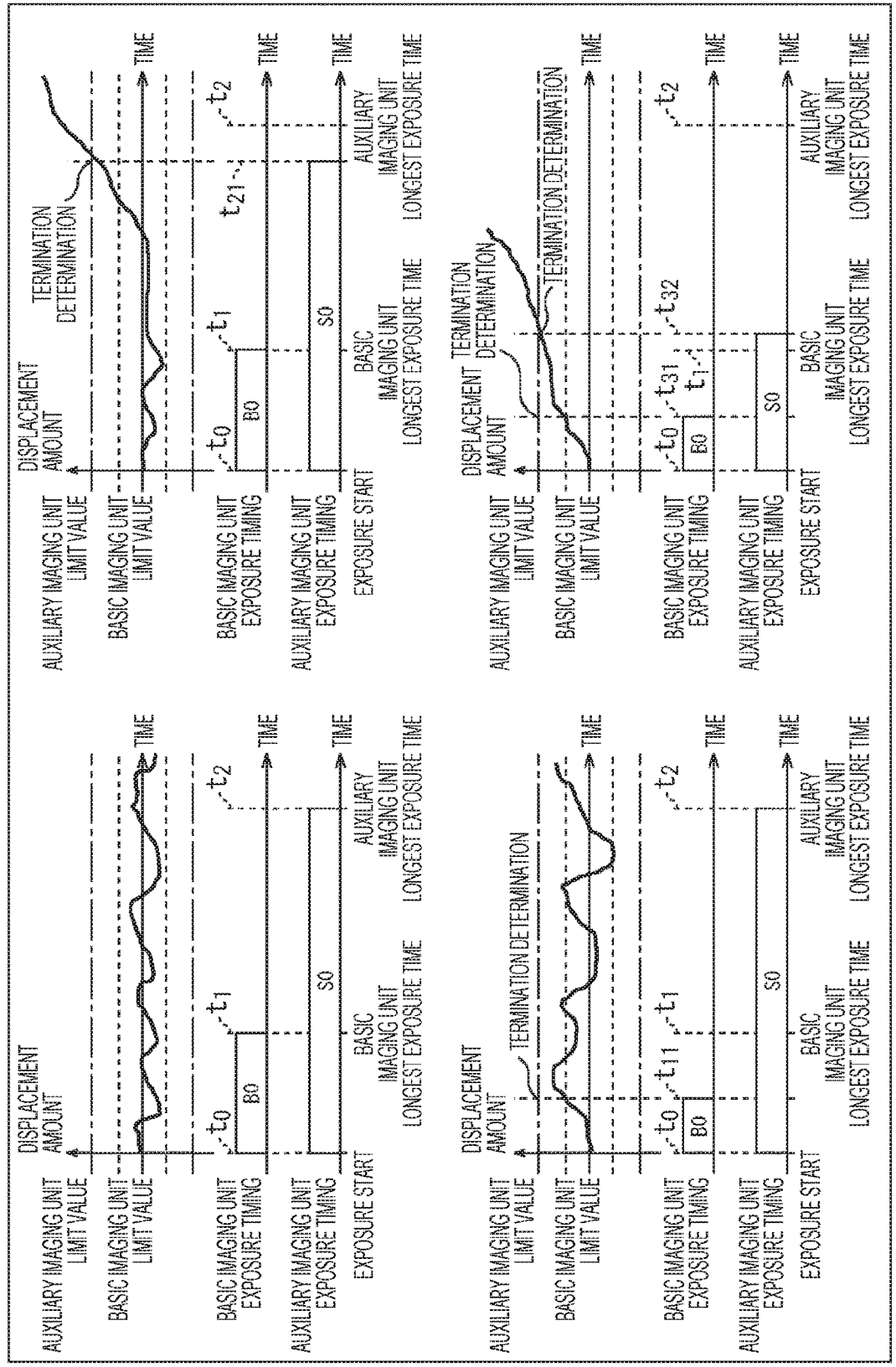
FIG. 3 is a view illustrating termination of exposure on the basis of a displacement amount of motion in the image composition processing by the image processing device in FIG. 1.

That is, for example, as illustrated in an upper left part in FIG. 3, in each of the basic imaging unit 31 and the auxiliary imaging unit 32, as long as the displacement amount of the motion (motion amount) is detected within a range set as the limit values, the exposure is continued until the longest exposure time, and then the pixel signal is read.

In FIG. 3, a graph indicating displacement in a time direction of the motion amount in a predetermined direction is illustrated in an upper stage in which the limit values of the basic imaging unit 31 and the auxiliary imaging unit 32 are indicated by a dotted line and a dashed-dotted line. Herein, an absolute value of the limit value in the basic imaging unit 31 is set to be equal to or smaller than an absolute value of the limit value in the auxiliary imaging unit 32. As a result, it is possible to obtain the image with less noise although this might blur more than that of the basic imaging unit 31.

Also, an exposure timing of the basic imaging unit 31 is illustrated in a middle stage and the exposure timing of the auxiliary imaging unit 32 is illustrated in a lower stage. More specifically, the exposure time of the basic imaging unit 31 is set from time t0 to t1, and a basic image B0 captured during the exposure period is illustrated. Also, the exposure time of the auxiliary imaging unit 32 is set from time t0 to t2, and an auxiliary image S0 captured during the exposure period is illustrated.

That is, a waveform of the motion amount in the upper stage in the upper left part in FIG. 3 does not exceed the limit value of the basic imaging unit 31 indicated by the dotted line and the limit value of the auxiliary imaging unit 32 until the longest exposure time elapses. Therefore, the basic imaging unit 31 realizes the exposure of the longest exposure time in the exposure period from time t0 to t1, thereby capturing the basic image B0. Also, the auxiliary imaging unit 32 realizes the exposure of the longest exposure time in the exposure period from time t0 to t2, thereby capturing the auxiliary image S0.

That is, in this case, the basic image and the auxiliary image are images with a sufficient amount of light.

On the other hand, a waveform of the motion amount in an upper stage in a lower left part in FIG. 3 exceeds the limit value of the basic imaging unit 31 indicated by the dotted line before the longest exposure time elapses. Therefore, since the displacement of the motion amount exceeds the limit value of the basic imaging unit 31 indicated by a dotted line at time t11, the basic imaging unit 31 terminates the exposure at that timing. Therefore, the basic imaging unit 31 captures the basic image B0 with the exposure period from time t0 to t11. At that time, since the displacement amount of motion (motion amount) does not exceed the limit value of the auxiliary imaging unit 32 until the longest exposure time elapses, the auxiliary imaging unit 32 realizes the exposure of the longest exposure time from time t0 to t2 being the longest exposure time, thereby capturing the auxiliary image S0.

That is, in this case, the basic image is a slightly dark image, but the auxiliary image is an image with a sufficient amount of light.

Furthermore, a waveform of the motion amount in an upper stage in an upper right part in FIG. 3 does not exceed the limit value of the basic imaging unit 31 indicated by a dotted line and the limit of the auxiliary imaging unit 32 indicated by a dashed-dotted line until the longest exposure time of the basic imaging unit 31 elapses, this exceeds the limit value of the auxiliary imaging unit 32 at time t21 before the longest exposure time of the auxiliary imaging unit 32 elapses. Therefore, since the displacement amount of motion (motion amount) exceeds the limit value of the basic imaging unit 31 indicated by a dashed-dotted line at time t21, the auxiliary imaging unit 32 terminates the exposure at that timing. Therefore, the basic imaging unit 31 captures the basic image B0 with the exposure period from time t0 to t11. At that time, since the displacement of the waveform of the motion amount exceeds the limit value of the auxiliary imaging unit 32 at time t21 before the longest exposure time elapses, the auxiliary imaging unit 32 realizes the exposure from time t0 to t21 being the longest exposure time, thereby capturing the image S0.

That is, in this case, the basic image is an image with a sufficient amount of light, but the auxiliary image is a dark image with a slightly insufficient light amount.

Also, since a waveform of the motion amount in an upper stage in a lower right part in FIG. 3 exceeds the limit value of the basic imaging unit 31 indicated by a dotted line at time t31 before the longest exposure time of the basic imaging unit 31 elapses, the basic imaging unit 31 terminates the exposure at timing of time t31. As a result, the basic imaging unit 31 captures the basic image B0 with the exposure period from time t0 to t31. On the other hand, the waveform of the motion displacement amount further increases after time t31 to exceed the limit of the auxiliary imaging unit 32 indicated by a dashed-dotted line at time t32, so that the auxiliary imaging unit 32 terminates the exposure at timing of time t32. Therefore, the auxiliary imaging unit 32 realizes exposure from time t0 to t32, thereby capturing the auxiliary image S0.

That is, in this case, the basic image and the auxiliary image are not images with a sufficient light amount, and are dark images with a slightly insufficient light amount.

However, in any case in FIG. 3, since the exposure is performed only within a range not exceeding the limit value which is an allowable range set in each of the basic imaging unit 31 and the auxiliary imaging unit 32, blurring is inhibited in any image.

As a result, even in a case where the long exposure is set, the exposure is terminated when the motion beyond the allowable range occurs within the exposure time, so that it is possible to reduce an effect of blurring.

Meanwhile, the example in which the exposure is terminated when the motion amount exceeds the allowable range in both the basic imaging unit 31 and the auxiliary imaging unit 32 is described above; however, it is also possible that the exposure of only one of the basic imaging unit 31 and the auxiliary imaging unit 32 is terminated in accordance with the motion amount. That is, since the basic imaging unit 31 captures the basic image serving as a main image, it is possible to terminate only the exposure of the auxiliary imaging unit 32 which captures the auxiliary image required for a high image quality according to the motion amount. By doing so, it is possible to composite the image with a better SNR with the blurring similar to that in the basic imaging unit 31.

2. Second Embodiment

<Configuration Example of Second Embodiment of Image Processing Device>

Although an example in which a longest exposure time calculated before imaging is started is used as that of a basic imaging unit 31 and an auxiliary imaging unit 32 is described above, for example, it is also possible to recalculate the longest exposure time in the auxiliary imaging unit 32 on the basis of the exposure time in the basic imaging unit 31 after the exposure in the basic imaging unit 31 is terminated, and make an exposure ratio between the auxiliary image in the auxiliary imaging unit 32 and the basic image captured by the basic imaging unit 31 not larger than a certain value.

Figure 4:
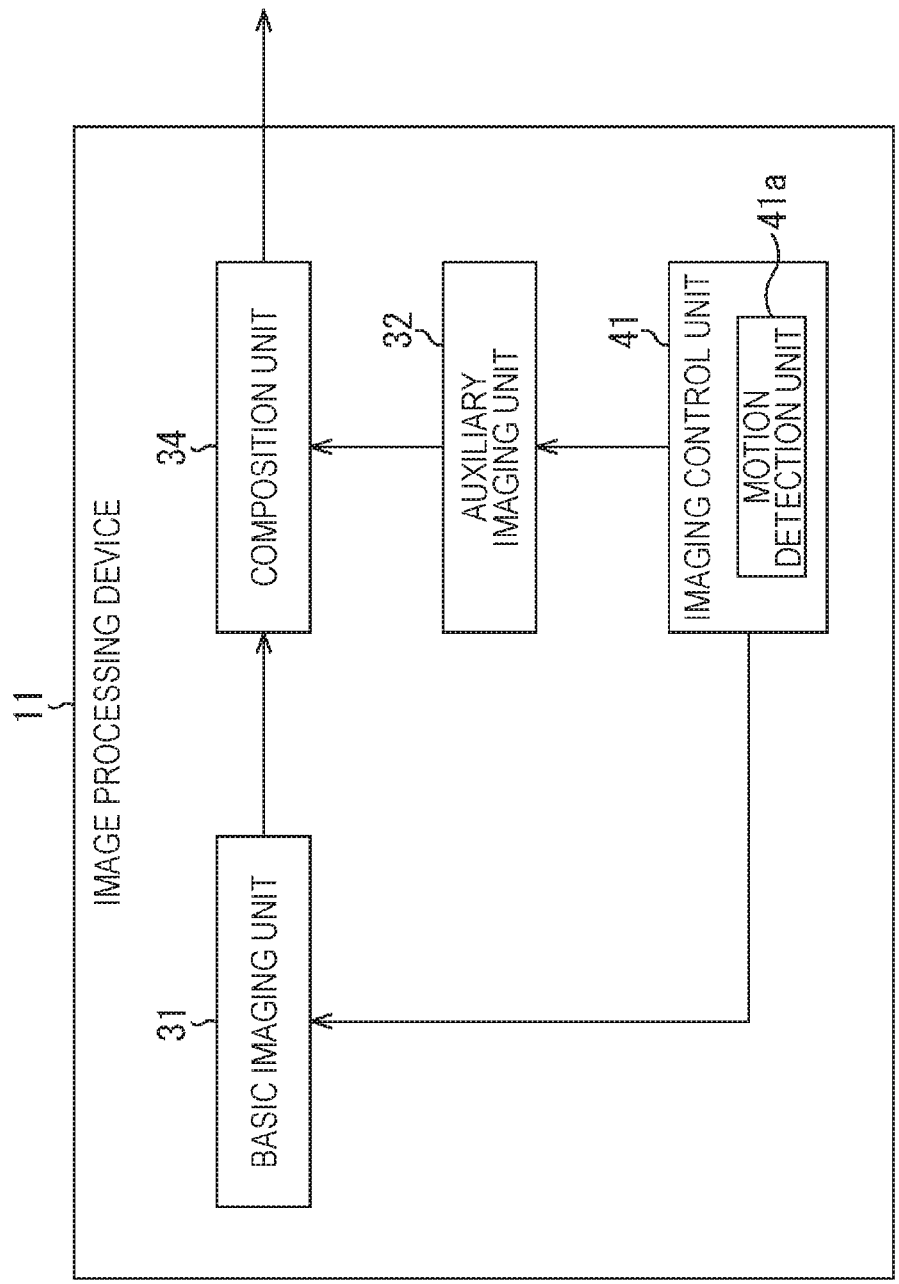
FIG. 4 is a view illustrating a configuration example of a second embodiment of an image processing device to which the present disclosure is applied.

FIG. 4 illustrates a configuration example of a second embodiment of an image processing device 11 configured to recalculate the longest exposure time in the auxiliary imaging unit 32 on the basis of the exposure time in the basic imaging unit 31 after the exposure in the basic imaging unit 31 is terminated. Meanwhile, in the image processing device 11 in FIG. 4, a configuration having the same function as that of the image processing device 11 in FIG. 1 is assigned with the same name and same reference sign and the description thereof is appropriately omitted.

That is, the image processing device 11 in FIG. 4 is different from the image processing device 11 in FIG. 1 in that an imaging control unit 41 is provided in place of an imaging control unit 33. After the exposure in the basic imaging unit 31 is terminated, the imaging control unit 41 recalculates to reset the longest exposure time in the auxiliary imaging unit 32 on the basis of the exposure time in the basic imaging unit 31. Generally, it is considered that compositing images with excessively large exposure ratio are difficult, because noise, a saturation region, and intensity of motion blurring differ. Therefore, it becomes possible to inhibit the exposure ratio between the basic image and the auxiliary image by this processing, thereby realizing a high image quality. Meanwhile, although the imaging control unit 41 is provided with a motion detection unit 41a, this has the same function as that of the motion detection unit 31a, so that the description thereof is omitted.

<Regarding Image Composition Processing by Image Processing Device in FIG. 4>

Image composition processing by the image processing device 11 in FIG. 4 is next described with reference to a flowchart in FIG. 5. Meanwhile, processes at steps S51 to S63 in the flowchart in FIG. 5 are similar to the processes at steps S11 to S23 in the flowchart in FIG. 2, so that the description thereof is omitted.

Figure 2:
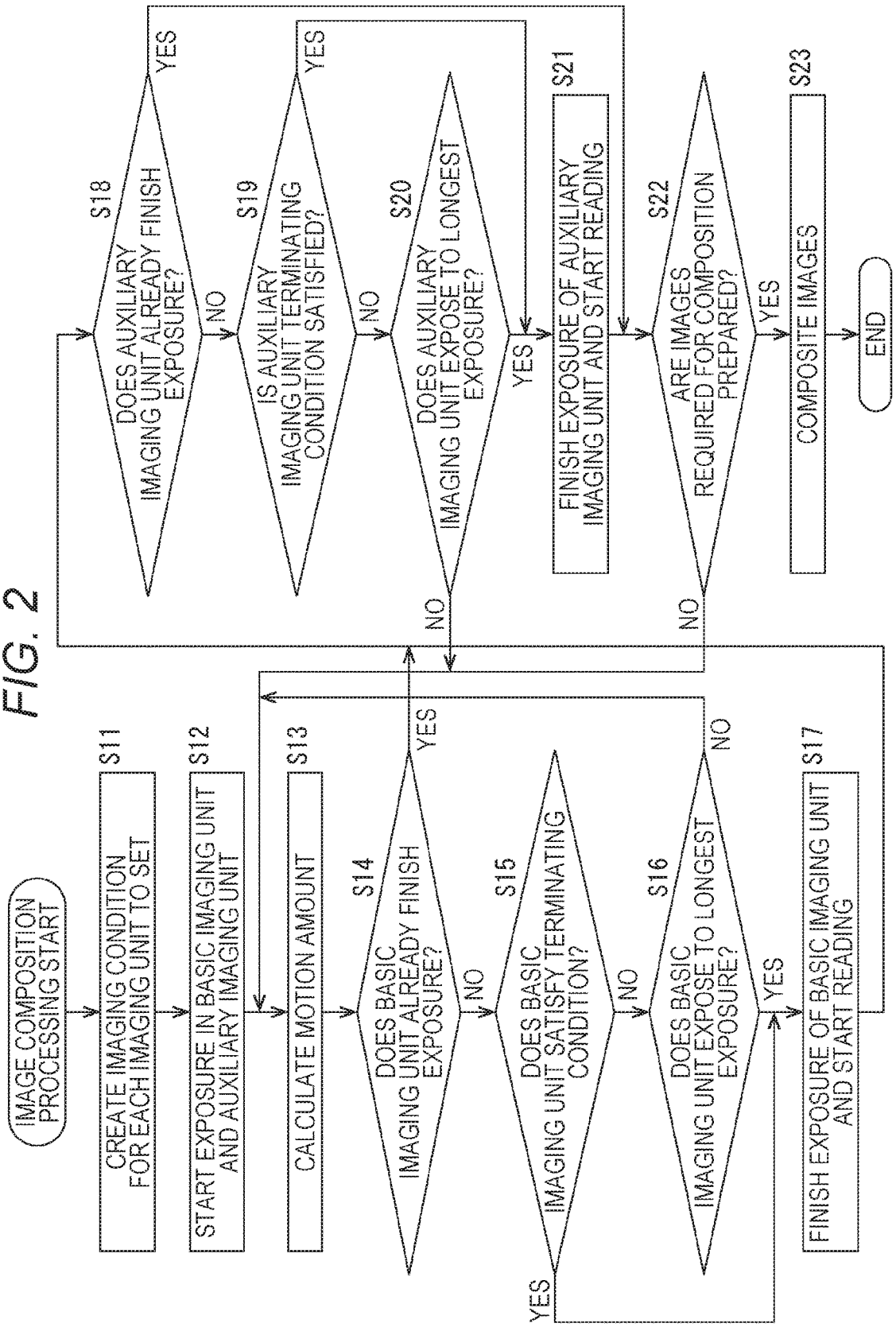
FIG. 2 is a flowchart illustrating image composition processing by the image processing device in FIG. 1.
Figure 5:
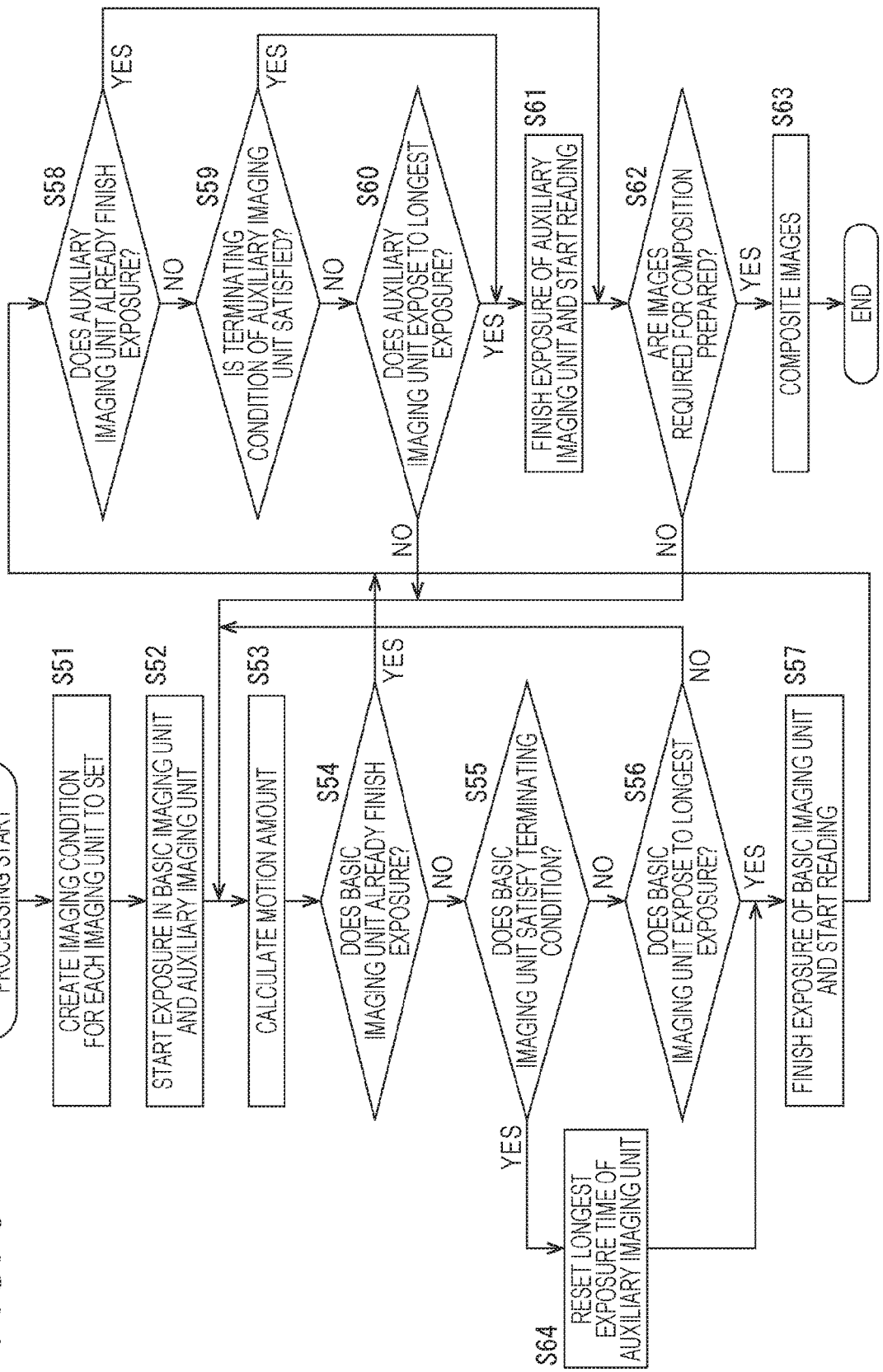
FIG. 5 is a flowchart illustrating image composition processing by the image processing device in FIG. 4.

That is, the flowchart in FIG. 5 is different from the flowchart in FIG. 2 in a process at step S64.

At step S55, the imaging control unit 41 determines whether a motion amount satisfies a condition for terminating the exposure of the basic imaging unit 31, and if the condition is regarded to be satisfied, the procedure shifts to step S64.

At step S64, the imaging control unit 41 recalculates to reset the longest exposure time of the auxiliary imaging unit 32, and the procedure shifts to step S57.

That is, for example, the imaging control unit 41 calculates the exposure time of the basic image at a timing at which the exposure of the basic imaging unit 31 is terminated, and resets the exposure time of a constant multiple of the calculated exposure time as the exposure time of the auxiliary imaging unit 32.

Figure 6:
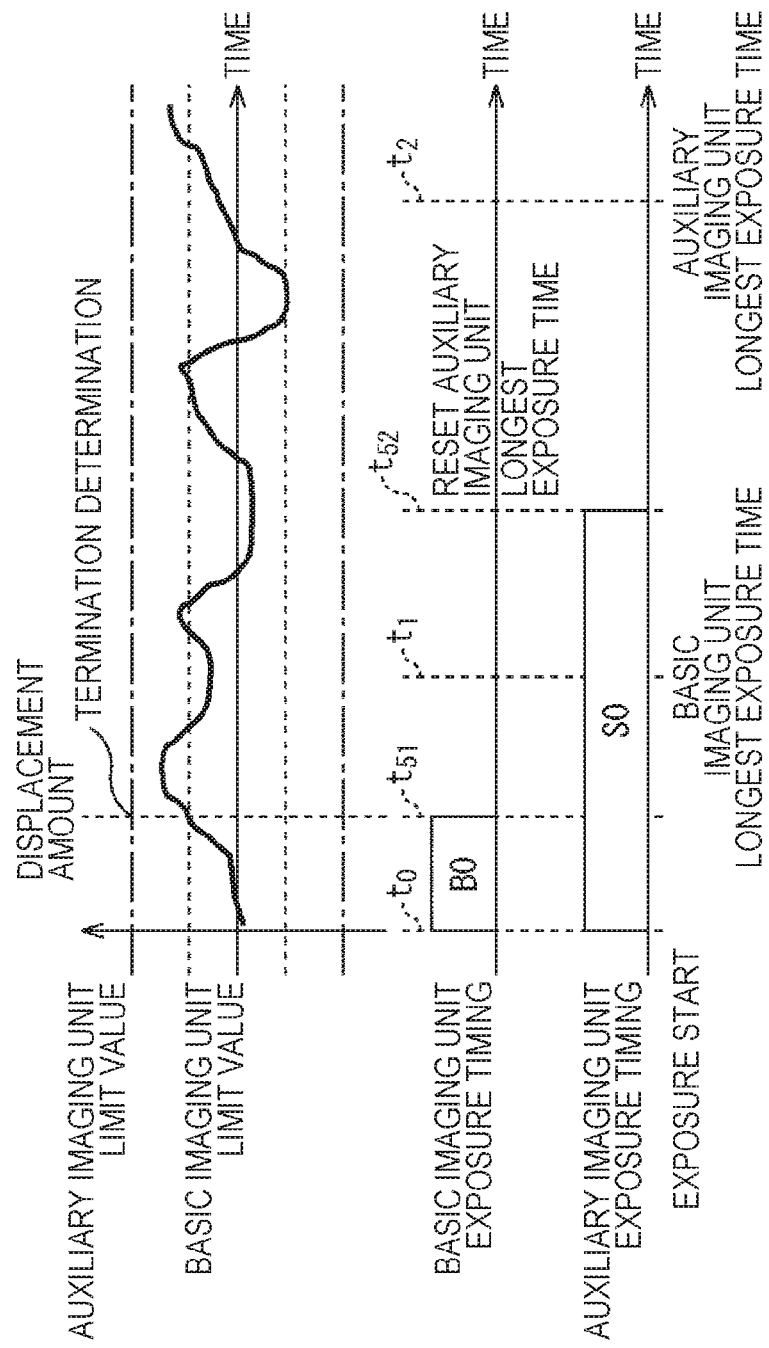
FIG. 6 is a view illustrating termination of exposure on the basis of a displacement amount of motion in the image composition processing by the image processing device in FIG. 4.

For example, as illustrated in FIG. 6, a displacement amount of motion (motion amount) in an uppermost stage exceeds a dotted line indicating an allowable range of the basic imaging unit 31 at time t51. At time t51, the exposure in the basic imaging unit 31 is terminated, and a pixel signal is read. At that time, the imaging control unit 41 recalculates to reset time obtained by multiplying the exposure time (time dt0 to t51) of the basic imaging unit 31 by a predetermined constant as the longest exposure time of the auxiliary imaging unit 32. In a case of FIG. 6, the recalculated time is from time t0 to t52.

By the above-described processing, in a case where a default longest exposure time of the basic imaging unit 31 and the longest exposure time of the auxiliary imaging unit 32 are set with a predetermined exposure time ratio, it becomes possible to capture the basic image and the auxiliary image with a substantially constant exposure time ratio even if the exposure time of the basic imaging unit 31 is terminated by resetting the exposure time such that the predetermined exposure time ratio is realized, and it becomes possible to reduce an effect of the noise, the saturation region, and the intensity of the motion blurring generated when compositing the images due to the large exposure ratio.

3. Third Embodiment

<Configuration Example of Third Embodiment of Image Processing Device>

Although a case where a motion amount is detected alone by a motion detection unit 33a or 41a including a sensor which detects motion such as a gyro sensor, an acceleration sensor, a six-axis sensor and the like is described above, it is also possible to detect the motion by using sequentially captured images.

Figure 7:
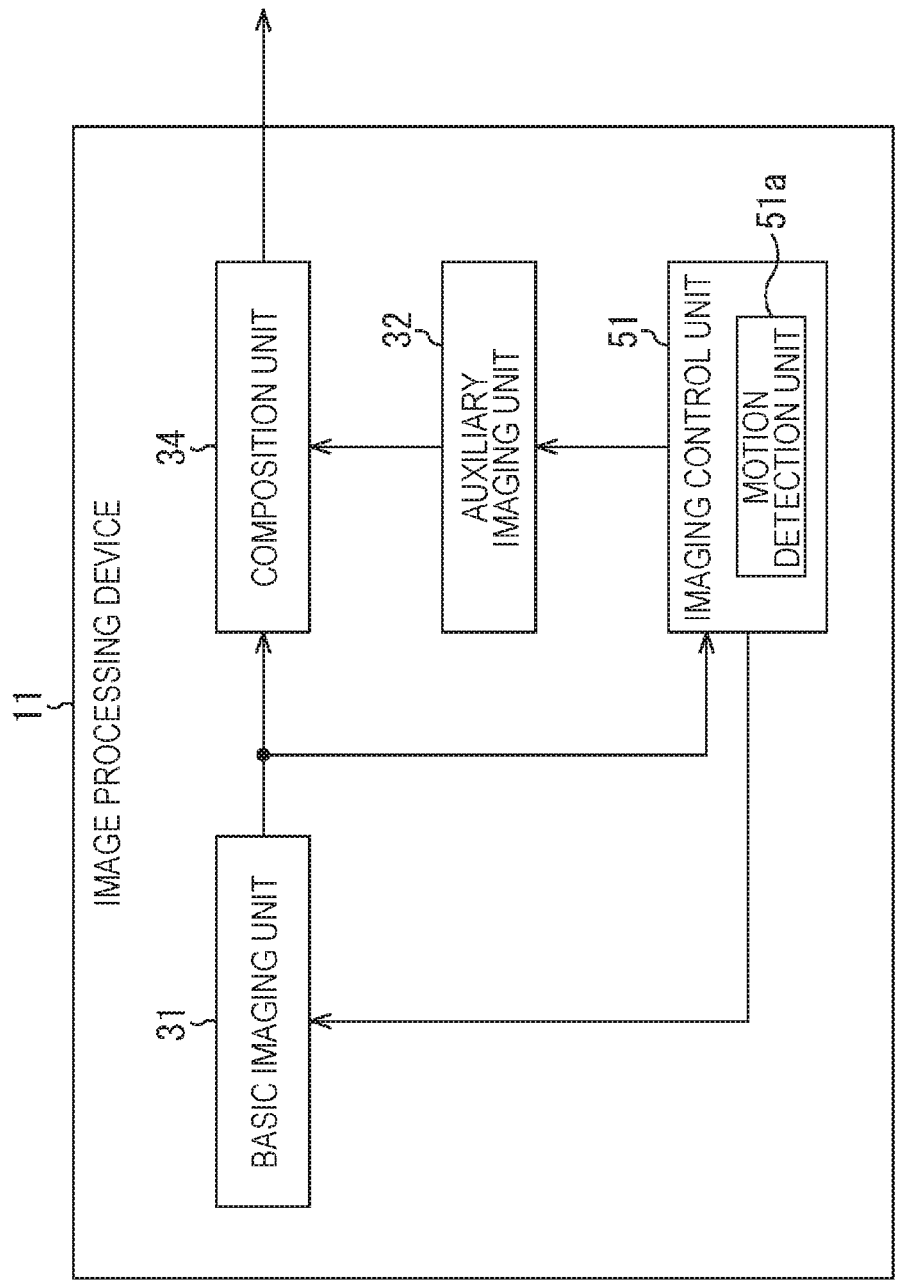
FIG. 7 is a view illustrating a configuration example of a third embodiment of an image processing device to which the present disclosure is applied.

FIG. 7 illustrates a configuration example of a third embodiment of an image processing device 11 in which the motion amount is obtained using the image captured by a basic imaging unit 31. Meanwhile, the image processing device 11 in FIG. 7 is different from the image processing device 11 in FIG. 1 in that an imaging control unit 51 is provided in place of an imaging control unit 33.

That is, although a basic function of the imaging control unit 51 is similar to that of the imaging control unit 33, a motion detection unit 51a detects the motion using the image captured by the basic imaging unit 31. In more detail, the imaging control unit 51 controls to repeat short-time exposure by the basic imaging unit 31 to capture a wave detection image for detecting the motion amount after the exposure by the basic imaging unit 31 is finished and a pixel signal is read and before exposure by an auxiliary imaging unit 32 is finished.

Figure 8:
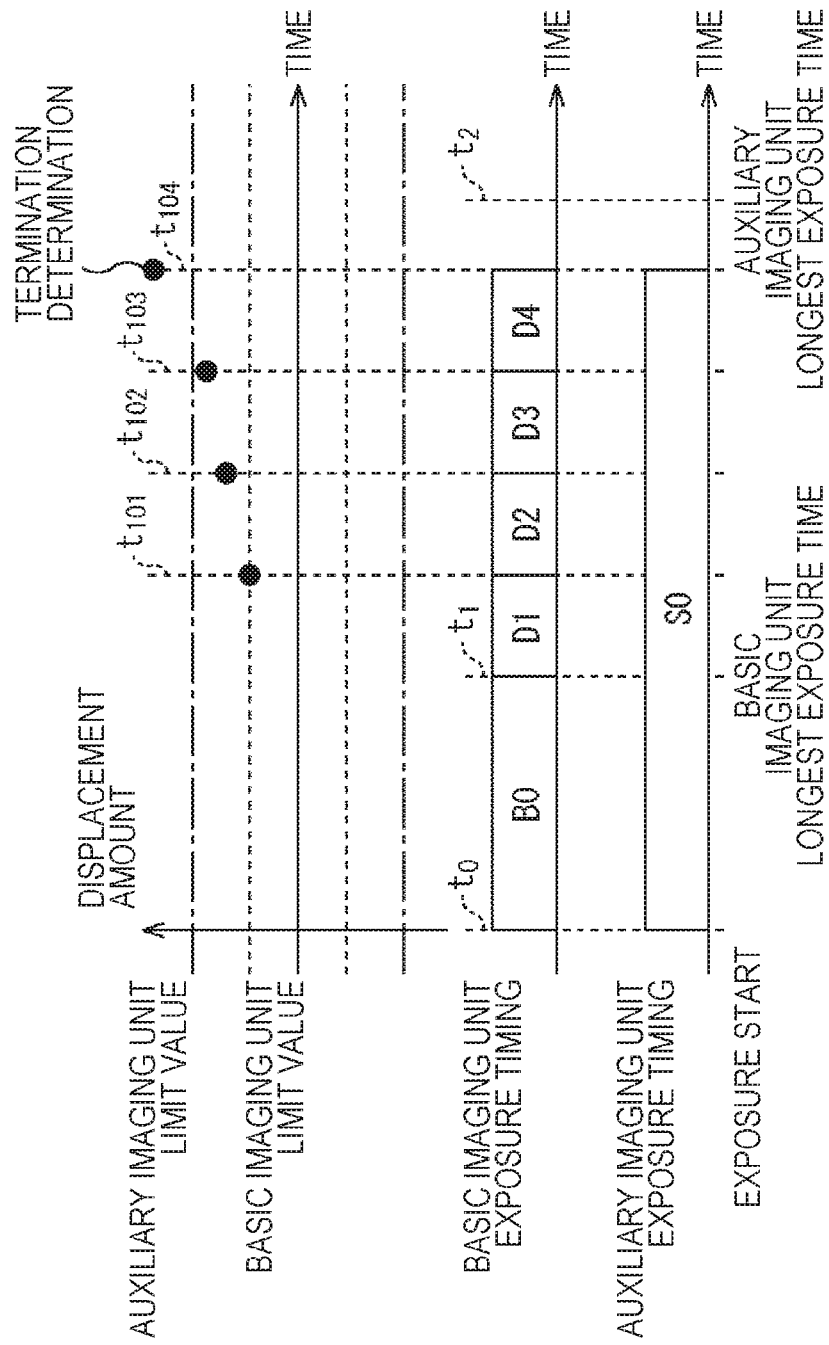
FIG. 8 is a view for illustrating termination of exposure on the basis of a displacement amount of motion obtained by using an image.

For example, as illustrated in FIG. 8, when a basic image B0 is captured by the basic imaging unit 31 from time t0 to t1, the exposure of an auxiliary image S0 is continued by the auxiliary imaging unit 32 until time t2. Therefore, from time t1 to t2, the imaging control unit 51 controls the basic imaging unit 31 to expose wave detection images D1 to D4 only for a very short time in order to detect the motion amount. In FIG. 8, the wave detection image D1 is exposed at time t1 to t101, the wave detection image D2 is exposed at time t101 to t102, the wave detection image D3 is exposed at time t102 to t103, and the wave detection image D4 is exposed at time t103 to t104.

The motion detection unit 51a obtains, for example, an inter-pixel difference absolute value sum and the like as difference between the image captured as the basic image B0 and the repeatedly captured wave detection images D1 to D4, and makes this a displacement amount of motion (motion amount). The imaging control unit 51 determines termination of the exposure of the auxiliary imaging unit 32 on the basis of the motion amount obtained by the motion detection unit 51a.

In FIG. 8, black dots found at respective timings of times t101 to t104 in an upper stage indicate the motion displacement amounts, that is, the inter-pixel difference absolute value sum between the basic image B0 and each of the wave detection images D1 to D4, and this exceeds a limit value of the auxiliary imaging unit 32 at time t104.

<Regarding Image Composition Processing by Image Processing Device in FIG. 7>

Figure 9:
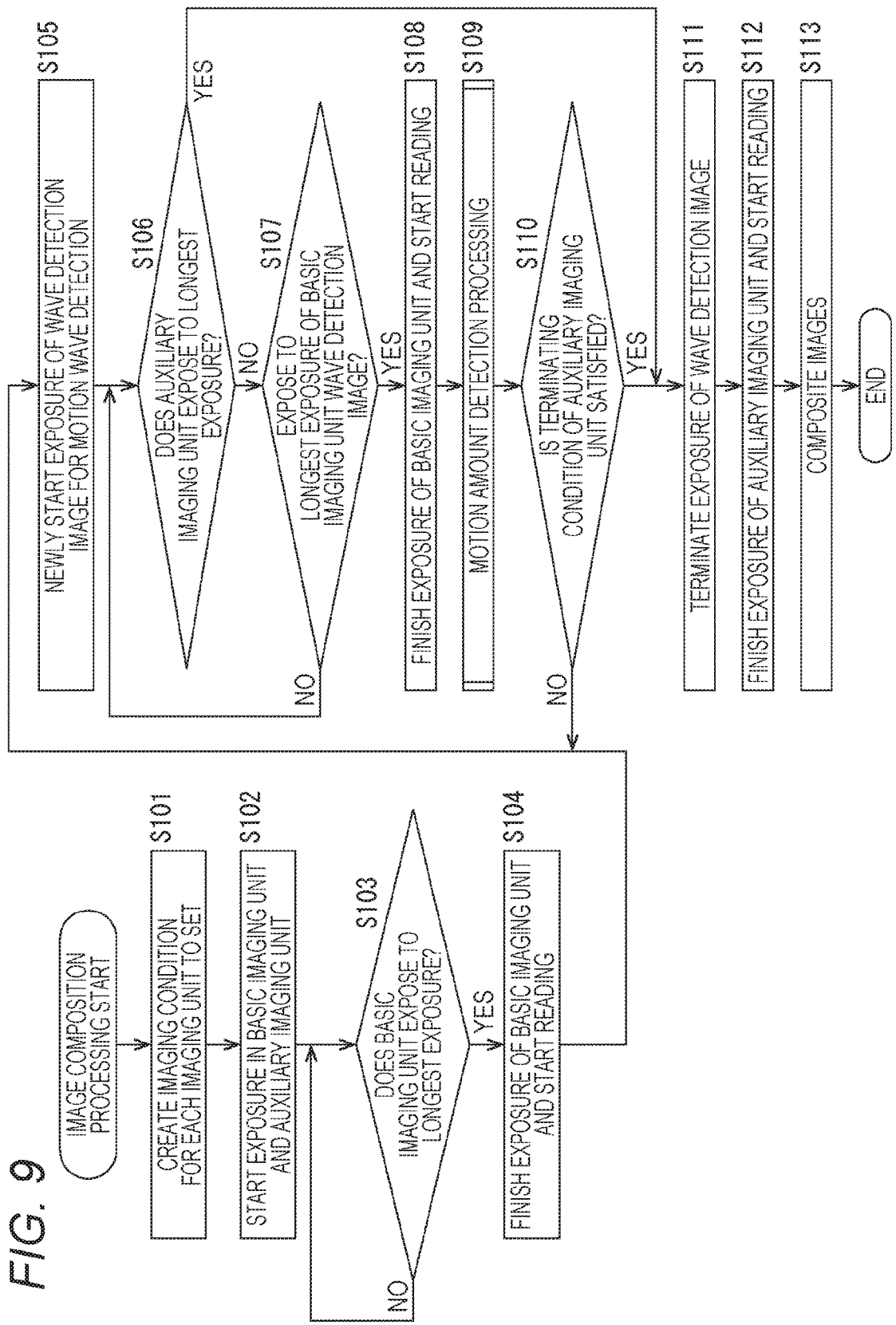
FIG. 9 is a flowchart illustrating image composition processing by the image processing device in FIG. 7.

Image composition processing by the image processing device 11 in FIG. 7 is next described with reference to a flowchart in FIG. 9.

At step S101, the imaging control unit 51 determines and sets the motion, longest exposure time, an analog gain, and on/off of a pixel addition mode which serve as imaging conditions of the basic imaging unit 31 and the auxiliary imaging unit 32.

At step S102, the imaging control unit 51 transmits an exposure start signal to the basic imaging unit 31 and the auxiliary imaging unit 32, and the basic imaging unit 31 and the auxiliary imaging unit 32 synchronously start the exposure.

At step S103, the imaging control unit 51 determines whether the exposure time of the basic imaging unit 31 reaches the longest exposure time and repeats the similar process until this reaches the longest exposure time. Then, in a case where this reaches the longest exposure time at step S103, the procedure shifts to step S104.

At step S104, the imaging control unit 51 finishes the exposure in the basic imaging unit 31 and starts reading the pixel signal.

At step S105, the imaging control unit 51 controls the basic imaging unit 31 to newly start the exposure of the wave detection image for detecting the motion amount.

At step S106, the imaging control unit 51 determines whether the exposure time of the auxiliary imaging unit 32 reaches the longest exposure time, and in a case where this does not reach the longest exposure time, the procedure shifts to step S107.

At step S107, the imaging control unit 51 determines whether the exposure time for the wave detection image of the basic imaging unit 31 reaches the longest exposure time, and in a case where this does not reach the longest exposure time, the procedure returns to step S106.

That is, the processes at steps S106 and S107 are repeated until the exposure times of both the basic imaging unit 31 and the auxiliary imaging unit 32 reaches the longest exposure time. Then, in a case where the exposure time for the wave detection image of the basic imaging unit 31 reaches the longest exposure time at step S107, the procedure shifts to step S108.

At step S108, the imaging control unit 51 finishes the exposure in the basic imaging unit 31 and starts reading the pixel signal.

At step S109, the imaging control unit 51 executes motion amount detection processing to detect the motion amount.

<Motion Amount Detection Processing Using Wave Detection Image>

Figure 10:
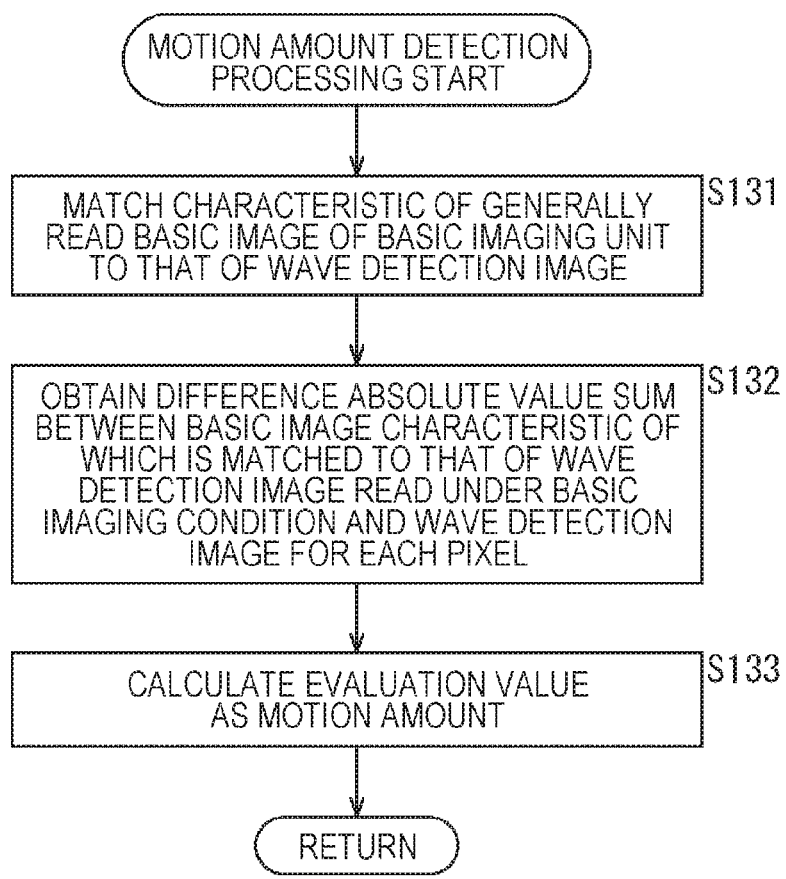
FIG. 10 is a flowchart illustrating motion amount detection processing in FIG. 8.

Herein, with reference to a flowchart in FIG. 10, the motion amount detection processing using the wave detection image is described.

At step S131, the motion detection unit 51a matches characteristic of the basic image captured by the basic imaging unit 31 to a characteristic of the wave detection image.

At step S132, the motion detection unit 51a calculates the inter-pixel difference absolute value sum between the basic image and the wave detection image with matched characteristics.

At step S133, the motion detection unit 51a outputs an evaluation value from the difference absolute value sum as the displacement amount of motion (motion amount).

The flowchart in FIG. 8 is herein described again.

At step S110, the imaging control unit 51 determines whether the motion amount satisfies a condition for terminating the exposure of the auxiliary imaging unit 32, and in a case where the condition is not satisfied, the procedure returns to step S105.

That is, after the exposure for capturing the basic image of the basic imaging unit 31 is finished, the processes from step S105 to S110 are repeated and the exposure of the auxiliary image by the auxiliary imaging unit 32 and the exposure and reading of the wave detection image by the basic imaging unit 31 are repeated.

Then, in a case where the exposure time of the auxiliary imaging unit 32 reaches the longest exposure time at step S106, or in a case where the motion amount satisfies the condition for terminating the exposure of the auxiliary imaging unit 32 at step S110, the procedure shifts to step S111.

At step S111, the imaging control unit 51 terminates the exposure of the wave detection image by the basic imaging unit 31.

At step S112, the imaging control unit 51 finishes the exposure in the auxiliary imaging unit 32 and starts reading the pixel signal.

At step S113, a composition unit 34 composites the basic image captured by the basic imaging unit 31 and the auxiliary image captured by the auxiliary imaging unit 32.

That is, by the above-described processes, as illustrated in FIG. 8, after the exposure of the basic image B0 started at time t0 is finished at time t1 in the processes at the steps S101 to S104, the processes at steps S105 to S110 are repeated, the exposure of the wave detection image D1 is performed at time t1 to t101, the exposure of the wave detection image D2 is performed at time t101 to t102, the exposure of the wave detection image D3 is performed at time t102 to t103, and the exposure of the wave detection image D4 is performed at time t103 to t104 until the exposure of the auxiliary image S0 is finished.

As a result, as illustrated in FIG. 8, the basic image and a plurality of wave detection images are captured within the exposure time of the auxiliary image.

Herein, the motion amount is obtained on the basis of the difference absolute value sum with the basic image B0 for each of the wave detection images D1 to D4 by the processes at steps S131 to S133 in the motion amount detection processing at step S109, and as illustrated in an upper stage in FIG. 8, the motion displacement amount as indicated by the black dots is obtained at each of times t101 to t104.

That is, the inter-pixel difference absolute value sum between the basic image B0 and the detection image D1 is obtained as the displacement of the motion amount at time t101, the inter-pixel difference absolute value sum between the basic image B0 and the wave detection image D2 is obtained as the displacement of the motion amount at time t102, the inter-pixel difference absolute value sum between the basic image B0 and the wave detection image D3 is obtained as the displacement of the motion amount at time t103, and the inter-pixel difference absolute value sum between the basic image B0 and the wave detection image D4 is obtained as the displacement of the motion amount at time t104.

Then, in FIG. 8, the displacement of the motion amount exceeds the limit value of the auxiliary imaging unit 32 indicated by a dashed-dotted line at time t104, so that the terminating condition of the auxiliary imaging unit 32 is satisfied at step S110. Therefore, the exposure time of the auxiliary image S0 is terminated at time t104, so that the auxiliary image S0 is an image whose exposure time is from the time t0 to t104.

Meanwhile, in FIG. 8, the displacement of the motion amount exceeds the limit value of the auxiliary imaging unit 32, so that the exposure of the auxiliary image is terminated at time t104; however, if the displacement of the motion amount does not exceed the limit value of the auxiliary imaging unit 32 even after time t104, the exposure is continued until the longest exposure time of the auxiliary imaging unit 32, and the exposure time of the auxiliary image S0 is the set time t0 to t2.

By the above-described processes, it becomes possible to terminate the exposure time according to the motion amount obtained using the image, so that the exposure is performed only within a range not exceeding the limit value being an allowable range set by the auxiliary imaging unit 32, so that blurring in the auxiliary image may be inhibited.

As a result, even in a case where the long exposure is set, the exposure is terminated in a case where the motion beyond the allowable range occurs within the exposure time, so that it is possible to reduce an effect of blurring.

Meanwhile, in the above-described process, by setting the exposure time of the wave detection image to an extremely short time, it is possible to increase the wave detection image to increase a temporal frequency of obtaining the motion displacement amount (motion amount), and as a result, it is possible to appropriately determine the termination of the exposure time with respect to the motion amount.

However, it is generally known that, when the exposure time is shortened, noise increases and performance of motion detection is deteriorated.

Therefore, when generating the wave detection image in a very short time, by imaging in the pixel addition mode, it is possible to detect the motion amount at high frequency while ensuring an SNR. Also, the pixel addition mode has an effect of reducing power consumption.

In addition, although the inter-pixel difference absolute value sum between the basic image and the wave detection image is used as the displacement of the motion amount in the description above, for detecting the motion, the displacement of the motion amount conventionally used may be detected by calculating a global motion vector, for example, or a simple method may be used.

In the motion detection using the image, unlike a case of detecting the motion with a configuration other than the image such as a gyro sensor, it is also possible to detect a moving object in the image, so that it is possible to detect the motion using an existing detection method.

For example, the global motion vector being the motion of the basic imaging unit 31 and the auxiliary imaging unit 32, a local motion vector (LMV) obtained by searching a moving subject by block matching, and a maximum value, a median value, an average value and the like of the LMV obtained by a conventional method such as an optical flow may be made the motion amount.

Furthermore, as described above, in a case where the motion is detected using the difference between images, not only the motion amount but also an area of the region that can be added is also important.

Therefore, by purely obtaining a difference absolute value for each pixel and obtaining an average of an entire image simply, an evaluation index may be obtained. However, at that time, it is necessary to obtain the difference after making the imaging conditions, the resolution, the exposure time (gain) and the like of the basic image and the wave detection image the same.

Also, by evaluating not a simple average of the differences but a weighted average with a weight of a main subject being increased, the moving subject may be detected more effectively.

For example, it is possible to determine whether to terminate the exposure depending on whether the average value of the difference absolute values in a face region obtained by another means represented by following equation (1) is larger than a given threshold.

[Equation 1]

$$E = \frac{\sum_{i \in \Omega} |b_i - d_i|}{\sum_{i \in \Omega} 1} \quad (1)$$

Herein, $b_i$ represents a pixel value at a coordinate i of the basic image captured by the basic imaging unit 31, $d_i$ represents a pixel value at a coordinate i of the wave detection image captured by the basic imaging unit 31, $\Omega$ represents a region recognized as a face in the reference imaging system, and E represents an evaluation value.

Furthermore, for example, it is also possible to determine whether to terminate the exposure depending on whether an average value of a result of convoluting a saliency map obtained by another means represented by following equation (2) and the difference absolute value is larger than a given threshold. Meanwhile, the saliency map is a map obtained by calculating a region of interest in an image according to a model of human visual area. That is, the saliency map is a map illustrating a region in an image that a person may be interested in.

[Equation 2]

$$E = \frac{\sum_{i \in \Omega} a_i \cdot |b_i - d_i|}{\sum_{i \in \Omega} a_i} \quad (2)$$

Herein, $b_i$ represents a pixel value at a coordinate i of the image captured by the basic imaging unit 31, $d_i$ represents a pixel value at a coordinate i of the wave detection image captured by the basic imaging unit 31, $a_i$ represents a value at the coordinate i of the saliency map, and E represents an evaluation value.

4. Fourth Embodiment

Although an example of a case where exposure start time of a basic imaging unit 31 conforms to the exposure start time of an auxiliary imaging unit 32 and exposure of the auxiliary imaging unit 32 finishes after the exposure of the basic imaging unit 31 finishes is described above, it is also possible that exposure finish time of the basic imaging unit 31 conforms to the exposure finish time of the auxiliary imaging unit 32.

Figure 11:
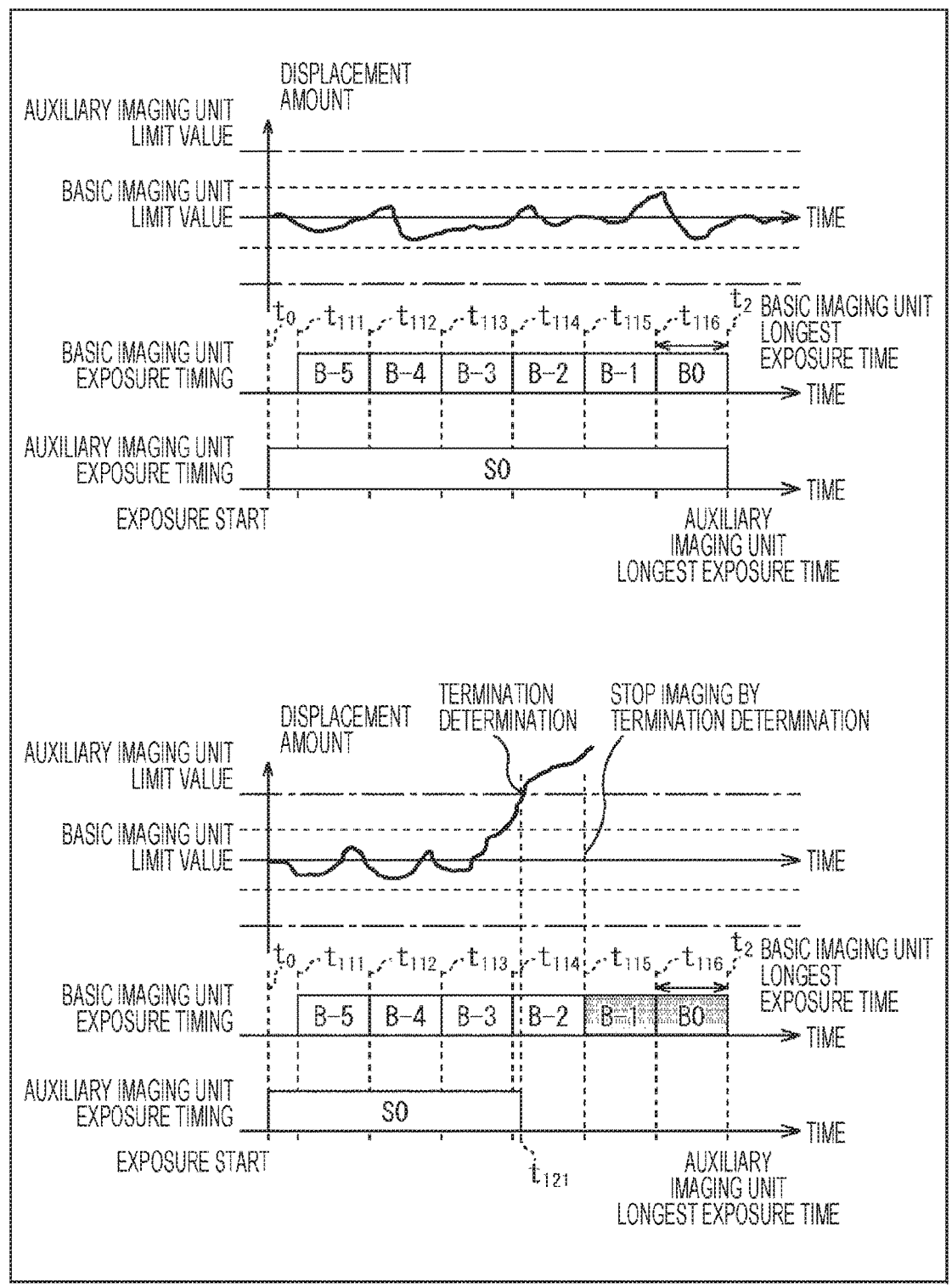
FIG. 11 is a view illustrating termination of exposure on the basis of a displacement amount of motion in exposure finish adjustment of a basic image and an auxiliary image.

That is, as illustrated in an upper stage in FIG. 11, in a case where the exposure of an auxiliary image S0 captured by the auxiliary imaging unit 32 is started at time t0 and the exposure finishes at time t2, the exposure for imaging starts at time t116 before time t2 by the exposure time of a basic image B0 by the basic imaging unit 31 such that the exposure of the basic image B0 captured by the basic imaging unit 31 also finishes at time t2.

At that time, from the start of the exposure of the auxiliary imaging unit 32 until time t116 when the basic imaging unit 31 starts the exposure of the basic image B0, basic images B-5, B-4, B-3, B-2, and B-1 are exposed at times t111 to t112, t112 to t113, t113 to t114, and t114 to t115, respectively, at a predetermined interval, for example, at an interval equal to that of the exposure time of the basic image B0 to be imaged.

By doing so, in processing of the auxiliary imaging unit 32, in a case where the exposure is terminated, any one of the basic images B-5, B-4, B-3, B-2, and B-1 exposed at timing close to timing at which the exposure of the auxiliary imaging unit 32 is terminated may be used in place of the basic image B0.

For example, as illustrated in the upper stage in FIG. 11, when the exposure of the auxiliary imaging unit 32 starts at time to, thereafter, from time t111, unless variation in motion amount exceeds a limit value of the auxiliary imaging unit 32, the basic images B-5, B-4, B-3, B-2, and B-1 are sequentially exposed, the exposure of the basic image B0 is finally started at time t116, and the exposure of the auxiliary image S0 also finishes in the auxiliary imaging unit 32 at time t2 at which the exposure of the basic image B0 finishes.

Also, as illustrated in a lower stage in FIG. 11, for example, in a case where the exposure of the basic image B-2 is started by the basic imaging unit 31 and a motion displacement amount exceeds the limit value in the auxiliary imaging unit 32 at time t121 before the exposure of the auxiliary imaging unit 32 finishes, the basic image B-3 captured at the timing the closest to time t121 at which this exceeds the limit value is handled as the basic image B0, the exposure of the basic imaging unit 31 is finished at time t115 at which the exposure of the basic image B-3 finishes, and the exposure of the auxiliary imaging unit 32 finishes at time t121.

In this case, in the basic imaging unit 31, the basic image B-3 exposed at time t113 to t114 is captured to be handled in the manner similar to that of the basic image B0, and in the auxiliary imaging unit 32, the auxiliary image S0 exposed from time t0 to t121 is captured.

<Configuration Example of Fourth Embodiment of Image Processing Device>

Next, a configuration example of a fourth embodiment of an image processing device 11 in which exposure finish times in a basic imaging unit 31 and an auxiliary imaging unit 32 are made the same is described with reference to a block diagram of FIG. 12. Meanwhile, in the image processing device 11 in FIG. 12, a configuration having the same function as that of the image processing device 11 in FIG. 1 is assigned with the same name and same reference sign and the description thereof is appropriately omitted.

Figure 12:
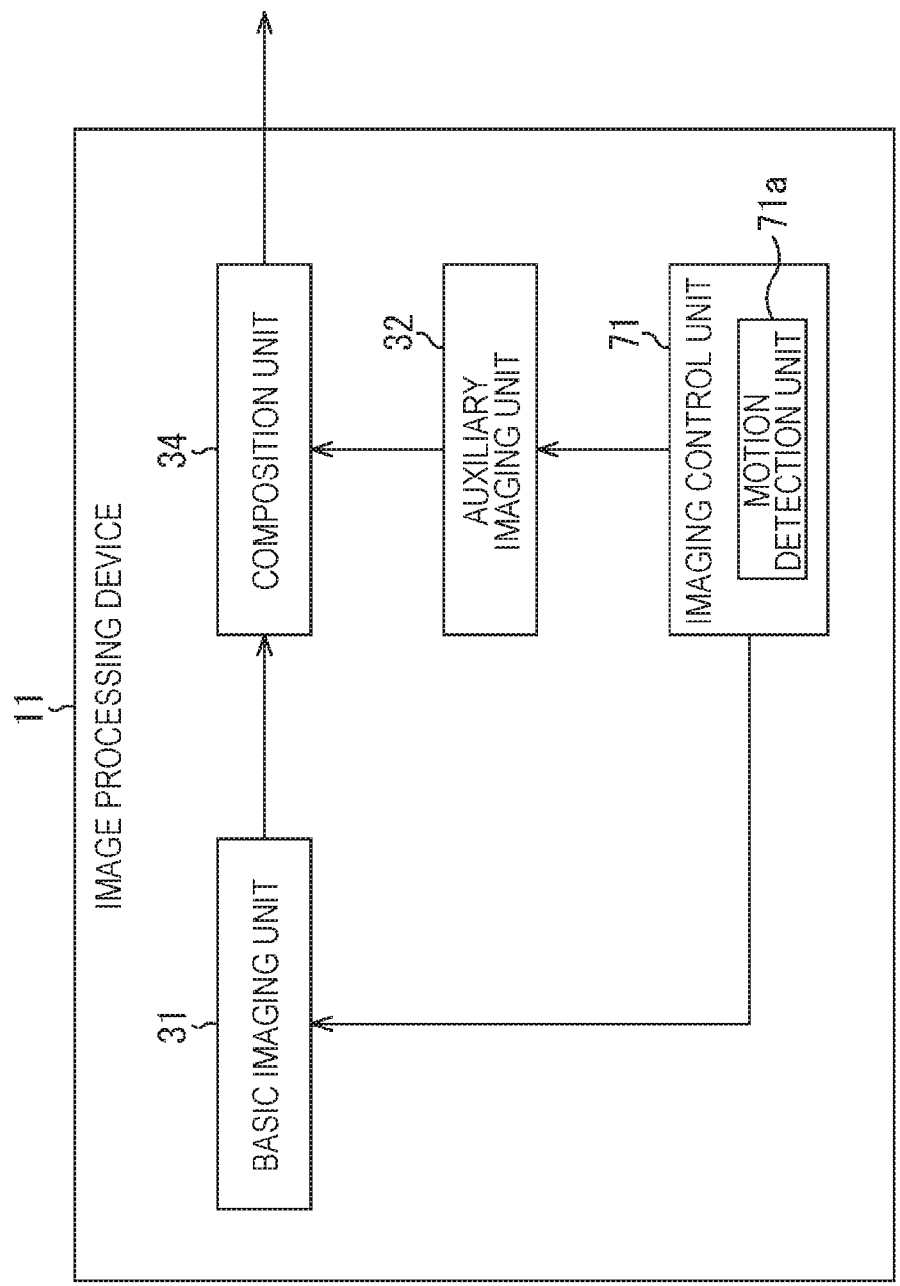
FIG. 12 is a view illustrating a configuration example of a fourth embodiment of an image processing device to which the present disclosure is applied.

The image processing device 11 in FIG. 12 is different from the image processing device 11 in FIG. 1 in that an imaging control unit 71 is provided in place of an imaging control unit 33. Although the imaging control unit 71 has a function similar to that of the imaging control unit 33 basically, an exposure finish timing in the basic imaging unit 31 is made the same as the exposure finish timing in the auxiliary imaging unit 32. By such a process, it is possible to obtain an effect similar to trailing-curtain synchronization (exposure finish matching) in flash photography. Meanwhile, although the imaging control unit 71 is provided with a motion detection unit 71a, this has the function similar to that of a motion detection unit 33a.

<Regarding Image Composition Processing by Image Processing Device in FIG. 12>

Image composition processing by the image processing device 11 in FIG. 12 is next described with reference to a flowchart in FIG. 13.

At step S151, the imaging control unit 71 determines and sets motion, a longest exposure time, an analog gain, and on/off of a pixel addition mode which serve as imaging conditions of the basic imaging unit 31 and the auxiliary imaging unit 32. At that time, the imaging control unit 71 sets exposure timings of the basic imaging unit 31 and the auxiliary imaging unit 32 by calculating following equation (3).

[Equation 3]

$$T_{Start}^{B} = T_{Max}^{S} - \text{floor}\left(\frac{T_{Max}^{S}}{T_{Max}^{B}}\right) \cdot T_{Max}^{B} \qquad (3)$$

Herein, $T_{start}^{B}$ represents an exposure start time of the basic imaging unit 31, $T_{Max}^{B}$ represents the longest exposure time of the basic imaging unit 31, $T_{Max}^{S}$ represents the longest exposure time of the auxiliary imaging unit 32, and floor (x) represents a function indicating the largest integer not exceeding x.

At step S152, the imaging control unit 71 transmits an exposure start signal to the auxiliary imaging unit 32, and the auxiliary imaging unit 32 starts the exposure. That is, for example, the auxiliary imaging unit 32 starts the exposure as at time t0 in a left part of FIG. 11.

At step S153, the imaging control unit 71 transmits the exposure start signal to the basic imaging unit 31, and the basic imaging unit 31 starts the exposure. That is, for example, the basic imaging unit 31 starts the exposure as at time t111 in an upper stage in FIG. 11.

At step 154, step 154 is repeated until the exposure time in the basic imaging unit 31 reaches the longest exposure time. In a case where the exposure time in the basic imaging unit 31 reaches the longest exposure time, the procedure shifts to step S155.

At step S155, the imaging control unit 71 finishes the exposure of the basic imaging unit 31 and reads data of a pixel signal to store in a memory. That is, in a case of first processing, the exposure of the basic image B-5 finishes and the pixel signal is read.

At step S156, the imaging control unit 71 starts next exposure of the basic imaging unit 31, and the procedure shifts to step S157. That is, if immediately after the exposure of the basic image B-5 finishes, the exposure of the basic image B-4 is started.

At step S157, the motion detection unit 71a calculates a motion displacement amount (motion amount).

At step S158, the imaging control unit 71 determines whether the motion amount satisfies a terminating condition of the exposure of the auxiliary imaging unit 32, and in a case where this does not satisfy the terminating condition, the procedure shifts to step S159.

At step S159, the imaging control unit 71 determines whether the exposure time of the basic imaging unit 31 reaches the longest exposure time, and in a case where this does not reach the longest exposure time, the procedure returns to step S157.

That is, when the terminating condition of the auxiliary imaging unit 32 is not satisfied, and the longest exposure time of the basic imaging unit 31, that is, herein, for example, the longest exposure time of the basic image B-5 does not elapse, the processes at steps S157 to S159 are repeated.

Then, at step S159, in a case where the exposure time in the basic imaging unit 31 reaches the longest exposure time, the procedure shifts to step S160.

At step S160, the imaging control unit 71 determines whether the exposure time of the auxiliary imaging unit 32 reaches the longest exposure time, and in a case where it is regarded that this does not reach, the procedure returns to step S155.

Then, at step S160, in a case where the exposure time of the auxiliary imaging unit 32 reaches the longest exposure time, the procedure shifts to step S161.

At step S161, the imaging control unit 71 finishes the exposure of the basic imaging unit 31 and the auxiliary imaging unit 32 and starts reading. At that time, the auxiliary imaging unit 32 outputs the read pixel signal as the auxiliary image S0 to a composition unit 34. Also, the basic imaging unit 31 stores an image captured by the latest exposure, that is, the basic image in the memory in the manner similar to that of the basic image repeatedly captured so far.

That is, when the exposure time of the auxiliary imaging unit 32 reaches the longest exposure time, the exposure time of the basic imaging unit 31 also reaches the longest exposure time, and furthermore, the image captured by the exposure of the basic imaging unit 31 at that time is the basic image B0. For example, in a case of the upper stage in FIG. 11, this is the processing at time t2.

At step S162, the imaging control unit 71 controls the basic imaging unit 31 to output the recently captured image as the basic image to the composition unit 34. Therefore, in this case, the basic image B0 is output in the case of the upper stage in FIG. 11.

At step S163, the composition unit 34 composites the basic image supplied from the basic imaging unit 31 and the auxiliary image supplied from the auxiliary imaging unit 32 to output.

On the other hand, at step S158, in a case where the condition of terminating the exposure of the auxiliary imaging unit 32 is satisfied, the procedure shifts to step S164. That is, for example, as illustrated at time t121 in the lower stage in FIG. 11, this is the processing when it exceeds the limit value of the auxiliary imaging unit 32 when the basic image B-3 is read.

At step S164, the imaging control unit 71 terminates the exposure in the auxiliary imaging unit 32 to finish and starts reading the pixel signal.

At step S165, the imaging control unit 71 determines whether the longest exposure time of the basic imaging unit 31 elapses, repeats the process at step S165 until the longest exposure time elapses, and stands by for the elapse of the longest exposure time. Then, when it is regarded that the longest exposure time elapses at step S165, the procedure shifts to step S166.

At step S166, the imaging control unit 71 finishes the exposure of the basic imaging unit 31 to start reading the pixel signal, and when the reading is completed, the procedure shifts to step S162. That is, since the exposure time of the basic image B-2 in the basic imaging unit 31 does not reach the longest exposure time at time t121 in the lower stage in FIG. 11, the pixel signal of the basic image B-2 is read after time t115.

At step S162, the imaging control unit 71 controls the basic imaging unit 31 to select any one of two basic images stored as the recently captured images to output to the composition unit 34. The basic image which may be selected is the basic image being exposed when the motion amount exceeds the limit value of the auxiliary imaging unit 32 and the basic image the exposure of which is completed just before the same. In a case of the lower stage in FIG. 11, they are the basic image B-2 being exposed when the motion amount exceeds the limit value of the auxiliary imaging unit 32, and the basic image B-3 the exposure of which is completed just before.

In any case, in the case of the lower stage in FIG. 11, the basic imaging unit 31 outputs the selected basic image B-2 or B-3 to the composition unit 34 as the basic image B0.

Among them, it is possible to select the basic image B-2 giving priority to the most recent one or select the basic image B-3 giving priority to the one having a long overlap with the exposure time of the auxiliary imaging unit 32.

Herein, since the basic image B-2 is the latest one, there is an advantage that the image is latest, but there is a disadvantage that the exposure is incomplete. In addition, as for the basic image B-3, although there is a disadvantage that the image is not the latest, there is an advantage that the exposure is fully completed.

Therefore, it is also possible to switch the basic image to be selected in accordance with the extent to which the exposure time elapses with respect to the longest exposure time of the basic image being exposed. For example, it is also possible to use a method of adapting the basic image being exposed (the basic image B-2 in the case of the lower stage in FIG. 11) in a case where 50% or more of the exposure of the basic image being exposed elapses with respect to the longest exposure time, and adopting an immediately preceding basic image the exposure of which is completed (the basic image B-3 in the case of the lower stage in FIG. 11) in a case of the exposure time not longer than this.

Then, in this case, at step S163, in the case of the lower stage in FIG. 11, the composition unit 34 composites the auxiliary image S0 exposed at time t0 to t121 by the auxiliary imaging unit 32 with the basic image selected from the basic image B-2 exposed at time t114 to t115 and the basic image B-3 exposed at time t113 to t114 by the basic imaging unit 31.

Through the above-described processing, it becomes possible to composite the basic image and the auxiliary image even in a case where a relationship between the basic image and the auxiliary image is set as exposure finish matching. Also, on the basis of the motion amount, when the motion is large, the auxiliary image whose exposure is terminated by the auxiliary imaging unit 32 and the basic image captured in the vicinity thereof are composited, so that it becomes possible to composite high-quality image without blurring according to the motion amount even in a case of the exposure finish matching.

Meanwhile, although the basic image the exposure of which is completed at the timing just before the motion amount by the basic image exceeds the limit of the auxiliary imaging unit 32 is used above at the time of terminating the exposure of the auxiliary imaging unit 32 according to the motion amount, it is also possible to fix to output any one of the basic image being exposed when the motion amount exceeds the limit value of the auxiliary imaging unit 32 or the basic image the exposure of which is completed at the immediately preceding timing (in the lower stage in FIG. 11, either the basic image B-2 or B-3 may be decided to be output).

In this case, in a case where the basic image being exposed when the motion amount exceeds the limit value of the auxiliary imaging unit 32 is fixedly adopted (in the case of adopting the basic image B-2 in the lower stage in FIG. 11), it is not necessary to provide a memory as compared with the configuration described above. That is, in the above-described configuration, it is one of the basic image the exposure of which is completed immediately before and the basic image that is currently being exposed which might be read as the basic image, so that it is required to include a memory capable of storing at least two images. On the other hand, in a case of outputting the basic image being exposed when the motion amount exceeds the limit value of the auxiliary imaging unit 32, there is no need to store the basic image the exposure of which is completed just before, and the memory is not required, so that a cost may be reduced.

Figure 13:
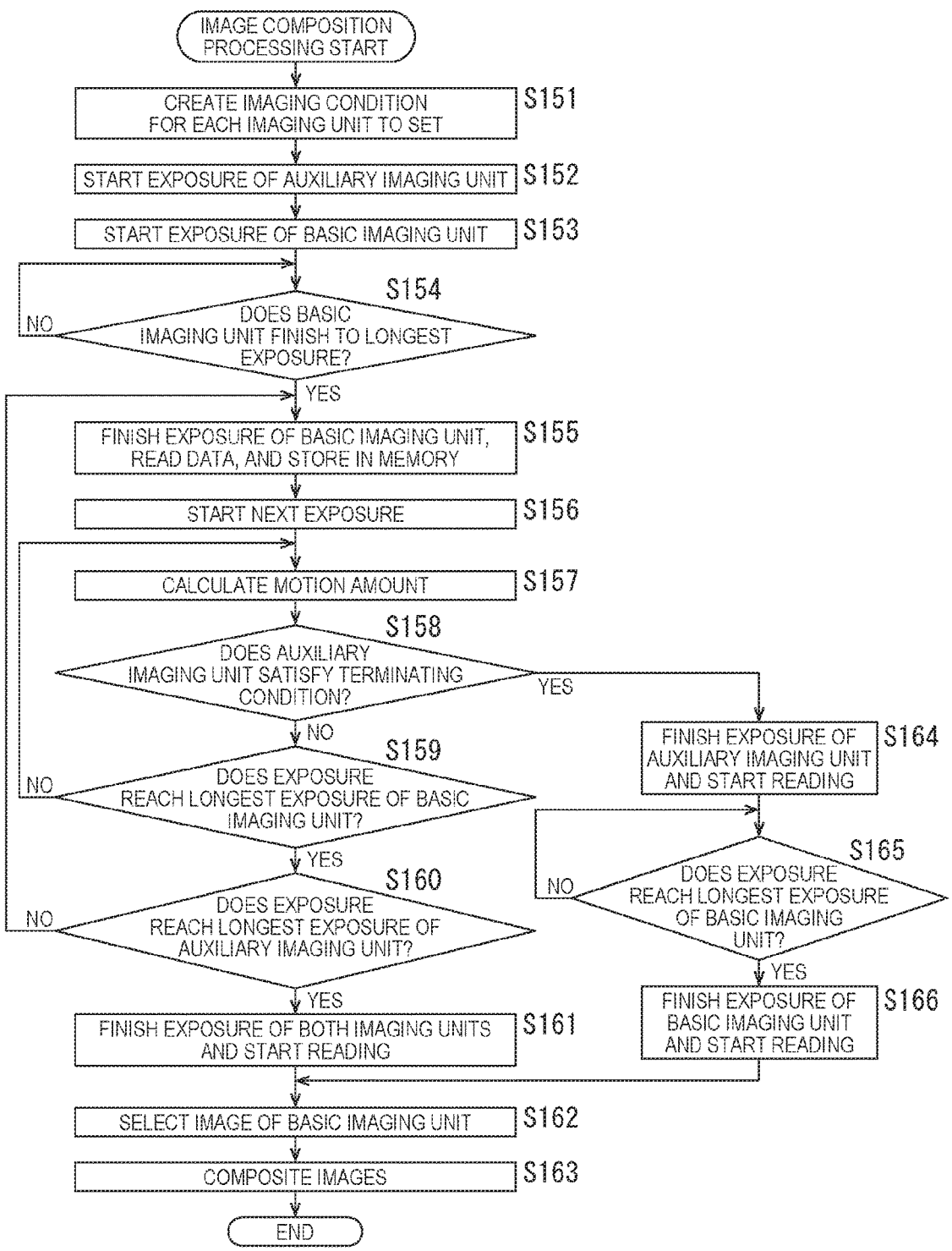
FIG. 13 is a flowchart illustrating image composition processing by the image processing device in FIG. 12.

Furthermore, in a case of adopting the basic image the exposure of which is completed just before (in a case of adopting the basic image B-3 in the lower stage in FIG. 11), it is possible to immediately terminate the exposure of the basic image being exposed, so that the processes at steps S165 and S166 in FIG. 13 are not required, and a processing velocity may be improved.

5. Fifth Embodiment

Although an example of generating a high-quality composite image by compositing images using still images is described above, this is also applicable to a moving image.

In the moving image, stability in a time direction is also a major factor in quality, so that an example in which exposure times of basic images captured by a basic imaging unit 31 are set at regular intervals and only the exposure of an auxiliary image captured by an auxiliary imaging unit 32 is terminated according to a motion amount is herein described, but the exposure time of the basic imaging unit 31 may be terminated also in the moving image.

Figure 14:
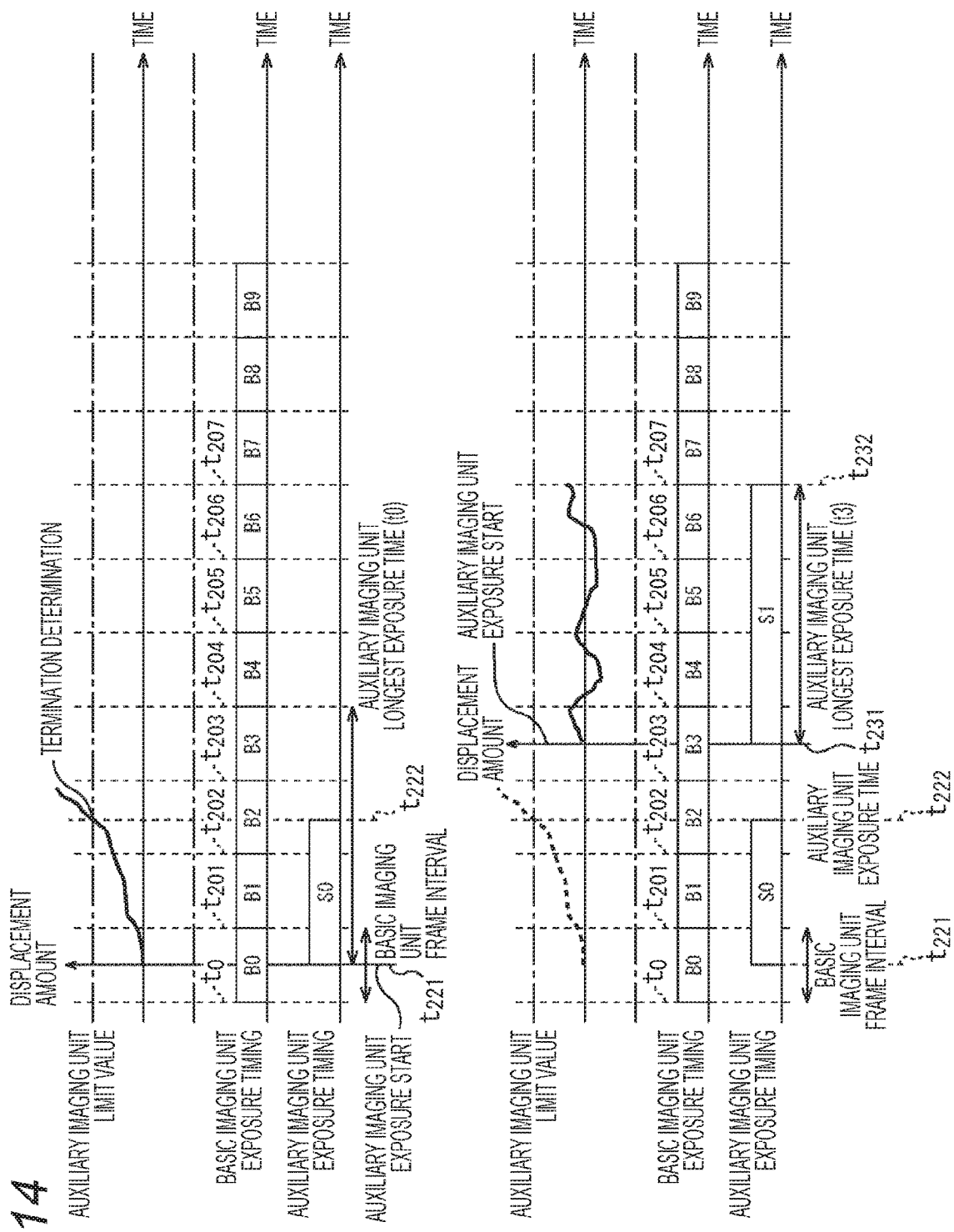
FIG. 14 is a view illustrating termination of exposure on the basis of a displacement amount of motion when capturing a basic image and an auxiliary image as moving images.

That is, as illustrated in an upper stage in FIG. 14, the exposure times are set at regular intervals such as t201, t202, t203, . . . from time t0 by the basic imaging unit 31, so that basic images B0, B1, B2, . . . are captured.

At that time, time t204 is set as exposure finish time, for example, such that time at which the longest exposure time elapses from the start of the exposure by the auxiliary imaging unit 32 at time t221 is the same as a reading timing of the basic image captured by the basic imaging unit 31. That is, in the upper stage in FIG. 14, the longest exposure time of the auxiliary imaging unit 32 is set from time t221 to t204. Basically, in this set state, the basic imaging unit 31 repeats the exposure at regular intervals, thereby capturing the basic images, and similarly, the auxiliary imaging unit 32 repeats exposure within the longest exposure time of the auxiliary imaging unit 32, thereby capturing the auxiliary image.

At that time, in a case where displacement of a motion amount exceeds a limit value of the auxiliary imaging unit 32 at time t222, the auxiliary imaging unit 32 terminates the exposure at time t222 and reads a pixel signal. That is, an auxiliary image S0 at that time is an image exposed for only from time t221 to t222.

Thereafter, as illustrated in a lower stage in FIG. 14, next longest exposure time is calculated on the basis of motion prediction at time t222, the calculated longest exposure time is set from predetermined time t231, and the exposure of the auxiliary imaging unit 32 is started. In the lower side in FIG. 14, the exposure of the auxiliary imaging unit 32 is started from time t231 in the exposure time of the basic image B3 which is a timing before the timing at which the exposure of the basic image B6 is finished by the time set as the longest exposure time.

By such processing, it becomes possible to capture the basic image and the auxiliary image at appropriate timings also in the moving image, and it is possible to generate a high-quality moving image by compositing them.

Meanwhile, in a case where the displacement of the motion amount exceeds the limit value of the auxiliary imaging unit 32 at time t222, it is also possible that the exposure of the auxiliary imaging unit 32 is not immediately terminated at time t222, but the exposure is continued until the set longest exposure time elapses, for example, and thereafter the exposure of the auxiliary imaging unit 32 may be terminated. By doing this, for example, in the upper stage of FIG. 14 and the like, since overlap between the basic images B2 and B3 and the auxiliary image S0 increases before and after the exposure is terminated, or the timings approach, so that artifact at the time of composition may be reduced.

<Configuration Example of Fifth Embodiment of Image Processing Device>

Next, a configuration example of a fifth embodiment of an image processing device 11 in which moving images are captured by the basic imaging unit 31 and the auxiliary imaging unit 32 and composited to generate a high-quality moving image is described with reference to a block diagram in FIG. 15. Meanwhile, in the image processing device 11 in FIG. 15, a configuration having the same function as that of the image processing device 11 in FIG. 1 is assigned with the same name and same reference sign and the description thereof is appropriately omitted.

Figure 15:
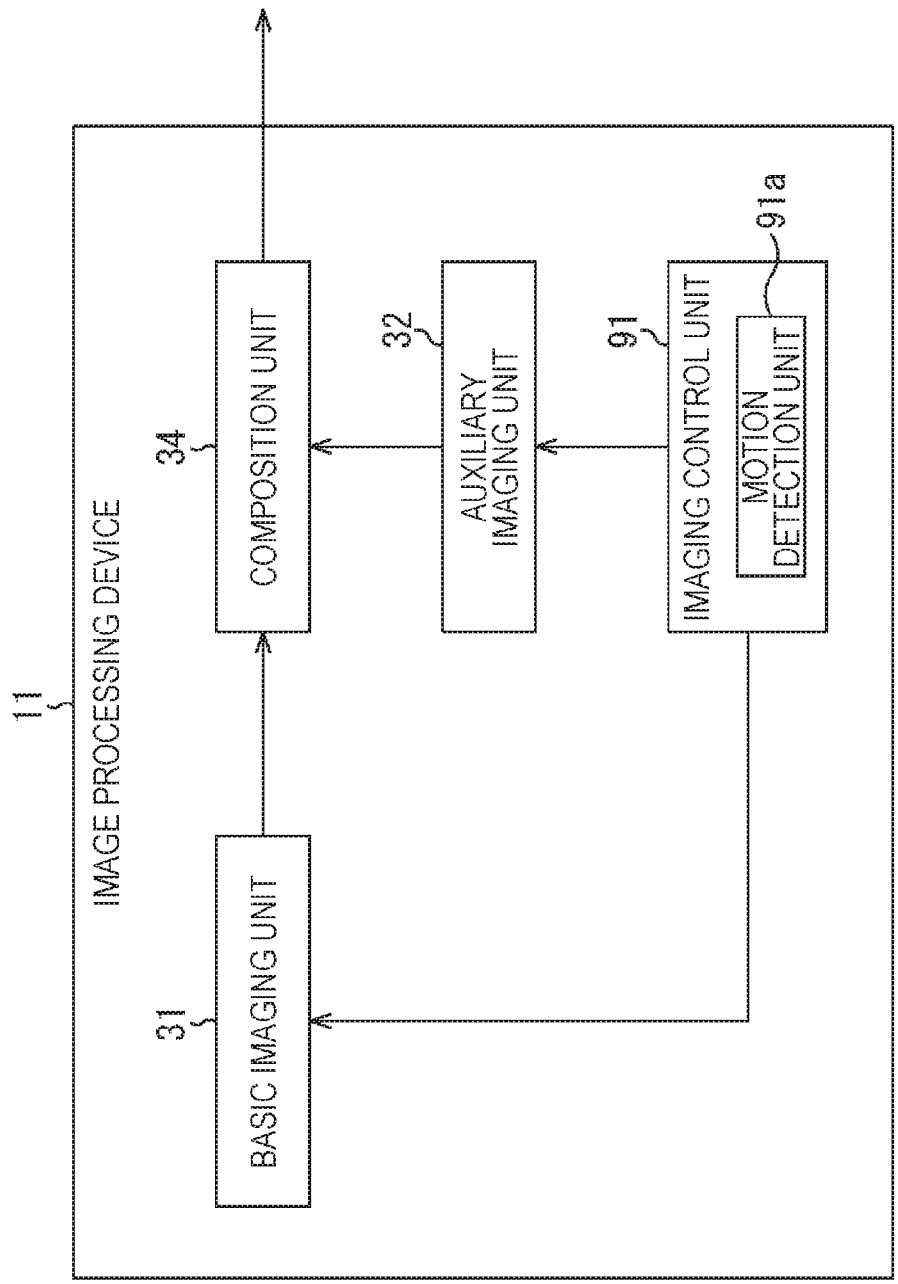
FIG. 15 is a view illustrating a configuration example of a fifth embodiment of an image processing device to which the present disclosure is applied.

The image processing device 11 in FIG. 15 is different from the image processing device 11 in FIG. 1 in that an imaging control unit 91 is provided in place of an imaging control unit 33. Basically, the imaging control unit 91 has a function similar to that of the imaging control unit 33; however, this has a function of compositing the basic image and the auxiliary image in moving image capturing by using the basic imaging unit 31 and the auxiliary imaging unit 32. Meanwhile, although the imaging control unit 91 is provided with a motion detection unit 91a, this has the function similar to that of the motion detection unit 33a.

<Regarding Image Composition Processing by Image Processing Device in FIG. 15>

Image composition processing by the image processing device 11 in FIG. 15 is next described with reference to a flowchart in FIG. 16.

At step S181, the imaging control unit 91 determines and sets motion, a longest exposure time, an analog gain, and on/off of a pixel addition mode which serve as imaging conditions of the basic imaging unit 31 and the auxiliary imaging unit 32. At that time, the imaging control unit 91 sets exposure timings of the basic imaging unit 31 and the auxiliary imaging unit 32 by calculating following equation (4).

[Equation 4]

$$T_{Start}^{S} = T_{Frame}^{S} - T_{Max}^{S} \quad (4)$$

$$T_{Frame}^{S} = \text{ceil}\left(\frac{T_{Max}^{S}}{T_{Max}^{B}}\right) \cdot T_{Max}^{B}$$

Herein, $T_{Start}^{S}$ represents auxiliary imaging system exposure start time, $T_{Frame}^{S}$ represents an auxiliary imaging system frame interval, $T_{Max}^{S}$ represents auxiliary imaging system longest exposure time, $T_{Max}^{B}$ represents basic imaging system longest exposure time, and ceil(x) represents a smallest integer not smaller than x.

At step S182, the imaging control unit 91 determines whether it is an exposure start timing of the basic imaging unit 31, and in a case where it is not the exposure start timing of the basic imaging unit 31, the procedure shifts to step S184.

At step S184, the imaging control unit 91 determines whether the longest exposure time of the basic imaging unit 31 elapses, and if not, the procedure shifts to step S186.

At step S186, the imaging control unit 91 determines whether it is an exposure start timing of the auxiliary imaging unit 32, and in a case where it is not the exposure start timing, the procedure returns to step S182. That is, in a case where it is not the exposure start timing of the basic imaging unit 31 and that of the auxiliary imaging unit 32, the processes at steps S182, S184, and S186 are repeated.

In a case where it is regarded to be the exposure start timing of the basic imaging unit 31 at step S182, the procedure shifts to step S183.

At step S183, the imaging control unit 91 starts the exposure of the basic imaging unit 31.

In a case where the longest exposure time of the basic imaging unit 31 elapses at step S184, the procedure shifts to step S185.

At step S185, the imaging control unit 91 finishes the exposure of the basic imaging unit 31, reads a pixel signal, and the procedure returns to step S182.

In a case where it is regarded to be the exposure start timing of the auxiliary imaging unit 32 at step S186, the procedure shifts to step S187.

At step S187, the imaging control unit 91 initializes the motion detection unit 91a to start the exposure of the auxiliary imaging unit 32.

At step S188, the imaging control unit 91 determines whether the exposure time of the basic imaging unit 31 reaches the longest exposure time, and in a case where it is regarded that this reaches the longest exposure time, the procedure shifts to step S189.

At step S189, the imaging control unit 91 determines whether there is an instruction to finish capturing the moving image, and in a case where there is no instruction to finish, the procedure shifts to step S190.

At step S190, the imaging control unit 91 finishes the exposure in the basic imaging unit 31 and reads the pixel signal.

At step S191, the imaging control unit 91 determines whether it is the exposure start timing of the basic imaging unit 31, and in a case where it is regarded to be the exposure start timing, the procedure shifts to step S192.

At step S192, the imaging control unit 91 controls the basic imaging unit 31 to start the exposure.

Meanwhile, in a case where the longest exposure time of the basic imaging unit 31 does not elapse at step S188, the processes at steps S189 to S192 are skipped, and in a case where it is not the timing at which the exposure of the basic imaging unit 31 is started at step S191, the process at step S192 is skipped.

At step S193, the imaging control unit 91 determines whether a terminating condition of the exposure of the auxiliary imaging unit 32 is satisfied on the basis of a detection result of the motion detection unit 91a, and in a case where the terminating condition is not satisfied, the procedure shifts to step S194.

At step S194, the imaging control unit 91 determines whether the exposure time of the auxiliary imaging unit 32 reaches the longest exposure time, and in a case where this does not reach the longest exposure time, the procedure returns to step S188.

That is, after the exposure by the auxiliary imaging unit 32 is started, in a case where the terminating condition is not satisfied, the longest exposure time does not elapse, and there is no instruction to finish capturing the moving image, the processes at steps S188 to S194 are repeated. Also, at that time, the basic imaging unit 31 sequentially repeats the exposure and reading of the basic image at predetermined intervals.

Meanwhile, in a case where the terminating condition of the exposure of the auxiliary imaging unit 32 is not satisfied at step S193, or the exposure time of the auxiliary imaging unit 32 reaches the longest exposure time, the procedure shifts to step S195. That is, when the imaging by the auxiliary imaging unit 32 is finished, the procedure shifts to step S195.

At step S195, the imaging control unit 91 determines whether there is an instruction to finish capturing the moving image, and in a case where there is no instruction to finish, the procedure shifts to step S196.

At step S196, the imaging control unit 91 finishes the exposure of the auxiliary imaging unit 32 and reads the pixel signal.

At step S197, the imaging control unit 91 controls the motion detection unit 91a to estimate the motion.

At step S198, the imaging control unit 91 resets the imaging conditions such as a next exposure start timing and the longest exposure time of the auxiliary imaging unit 32 on the basis of a motion estimation result.

At step S199, the imaging control unit 91 determines whether it is the exposure start timing of the auxiliary imaging unit 32, and in a case where it does not reach the exposure time, the procedure returns to step S188. That is, the exposure and reading of the basic images by the basic imaging unit 31 are repeated at predetermined intervals, and further the exposure and reading of the auxiliary image by the auxiliary imaging unit 32 are repeated while the exposure start timing and exposure time are appropriately set by motion estimation.

Then, when it is instructed to finish capturing the moving image at step S189 or S195, the procedure shifts to step S200.

At step S201, the imaging control unit 91 simultaneously controls the basic imaging unit 31 and the auxiliary imaging unit 32 to finish the exposure and allows the composition unit 34 to read the pixel signal.

At step S202, the composition unit 34 composites the moving image of the basic image read from the basic imaging unit 31 and the auxiliary image read from the auxiliary imaging unit 32 to output.

By the above-described processing, since the exposure is terminated in accordance with the motion even in the moving image, it is possible to realize a high-definition moving image by compositing the basic image and the auxiliary image that are not affected by blurring.

Meanwhile, latency may be prioritized so that composition is performed according to a frame rate of the basic imaging unit 31.

That is, the latest image is used as the basic image of the basic imaging unit 31. The latest image is held in the memory as the auxiliary image of the auxiliary imaging unit 32, and an old image in the memory is used until the next read timing.

That is, in a case illustrated in the lower side in FIG. 14, for example, the basic images B2 to B5 and the auxiliary image S0 are composited, and the basic images after the basic image B6 to the next image of the auxiliary imaging unit 32 and the auxiliary image S1 are combined to be composited. With this combination, it is possible to composite and output the moving image while minimizing latency.

On the other hand, in a case where priority is given to image quality, the images of the basic imaging unit 31 and auxiliary imaging unit 32 are accumulated once in the memory and then composited. That is, if the exposure times match as much as possible, artifacts at the time of composition are small, so that a high quality moving image may be realized by compositing with the combination of exposure timings with the closest time barycenter of the exposure time.

Figure 16:
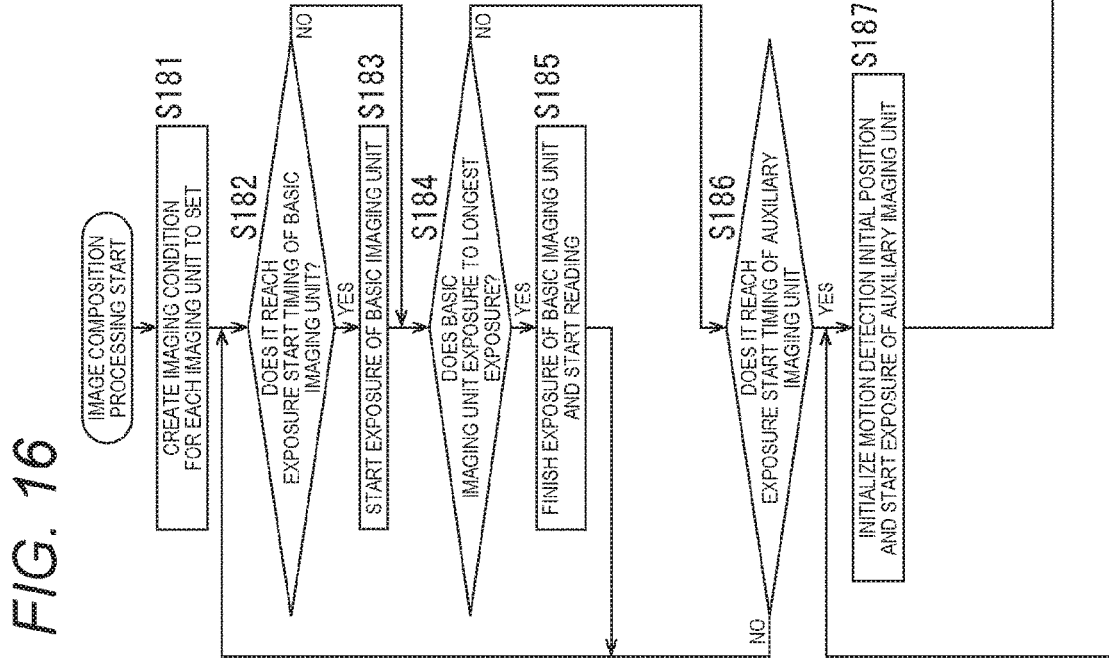
FIG. 16 is a flowchart illustrating image composition processing by the image processing device in FIG. 15.

Meanwhile, in examples in FIGS. 15 and 16, the example in which the motion detection unit 91a includes a sensor and the motion is detected by the output thereof is described, but the motion may also be detected using continuous images of moving image. In this case, the basic images B1 to B3 may be replaced with the wave detection images D1 to D3, and the image of the basic imaging unit 31 at the time of start of imaging by the auxiliary imaging unit 32 as a reference may be compared with another image of the basic imaging unit 31 such as the basic images B0 and B1, B0 and B2, and B0 and B3.

According to the technology of the present disclosure, optimum exposure time is realized by adaptively changing the exposure time. Also, sensitivity improvement by pixel addition is introduced, and it is possible to obtain a high-sensitivity auxiliary image with the exposure time and timing matched with those of the basic imaging unit in the pixel addition operation, so that even images with camera shake and including a moving subject may be composited. Furthermore, by combining exposure time extension with maintained resolution and the pixel addition operation that is strong against motion blurring according to the motion amount, it is possible to obtain a stable effect regardless of a scene.

6. Application Example

<Example of Execution by Software>

A series of processes described above may be executed by hardware or by software. In a case where a series of processes is executed by the software, a program which forms the software is installed from a recording medium on a computer built in dedicated hardware or a general-purpose personal computer or the like, for example, capable of executing various functions with various programs installed.

Figure 17:
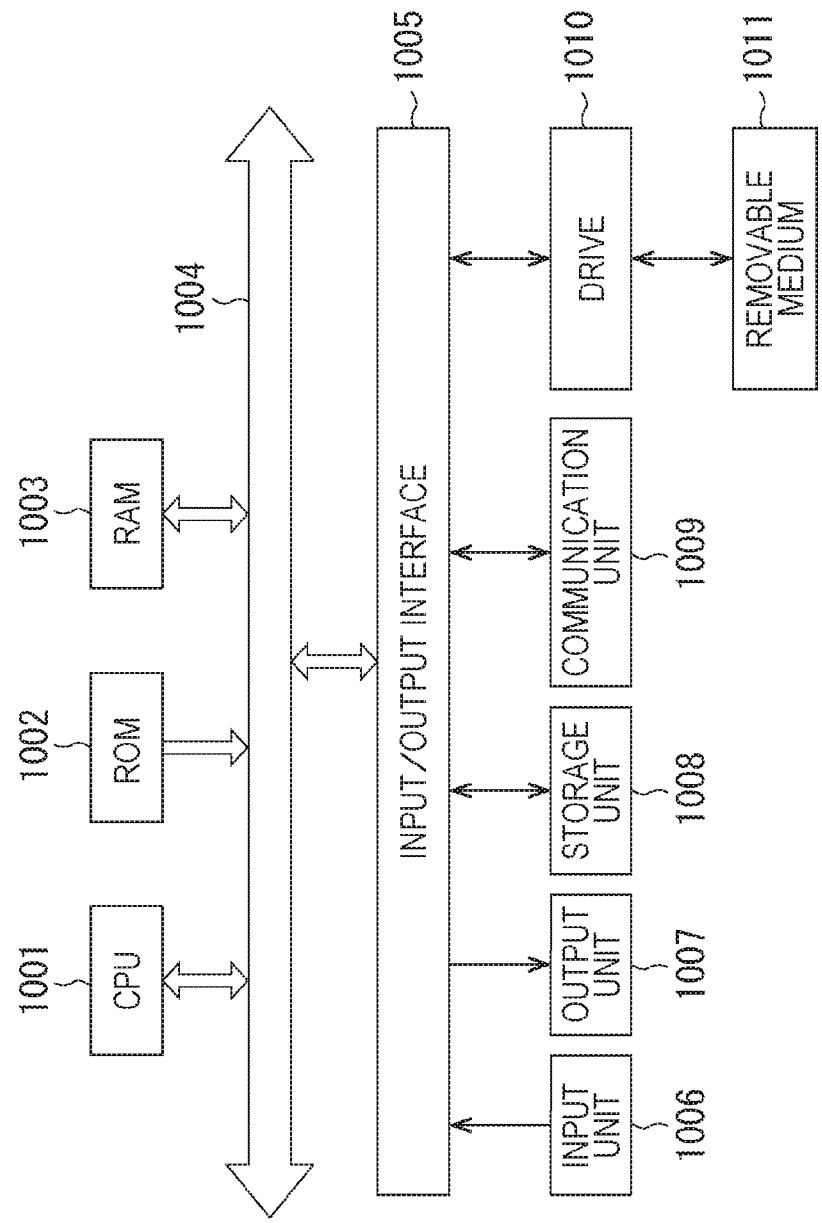
FIG. 17 is a view illustrating a configuration example of a general-purpose personal computer.

FIG. 17 illustrates a configuration example of the general-purpose personal computer. The personal computer includes a central processing unit (CPU) 1001 built-in. An input/output interface 1005 is connected to the CPU 1001 through a bus 1004. A read only memory (ROM) 1002 and a random access memory (RAM) 1003 are connected to the bus 1004.

An input unit 1006 including an input device such as a keyboard and a mouse with which a user inputs an operation command, an output unit 1007 which outputs a processing operation screen and an image of a processing result to a display device, a storage unit 1008 including a hard disk drive and the like which stores the program and various data, and a communication unit 1009 including a local area network (LAN) adopter and the like which executes a communication process through a network typified by the Internet are connected to the input/output interface 1005. Also, a drive 1010 which reads/writes data from/to a removable medium 1011 such as a magnetic disk (including a flexible disk), an optical disk (including a compact disc-read only memory (CD-ROM) and a digital versatile disc (DVD)), a magneto-optical disk (including a Mini Disc (MD)), or a semiconductor memory is connected.

The CPU 1001 executes various processes according to the program stored in the ROM 1002 or the program read from the removable medium 1011 such as the magnetic disk, the optical disk, the magneto-optical disk, or the semiconductor memory to be installed on the storage unit 1008 and loaded from the storage unit 1008 on the RAM 1003. Data required for the CPU 1001 to execute the various processes and the like also are appropriately stored in the RAM 1003.

In the computer configured in the above-described manner, the CPU 1001 loads the program stored in the storage unit 1008, for example, on the RAM 1003 through the input/output interface 1005 and the bus 1004 to execute, so that the series of processes described above is performed.

The program executed by the computer (CPU 1001) may be recorded in the removable medium 1011 as a package medium and the like to be provided, for example. Also, the program may be provided by means of a wired or wireless transmission medium such as a local region network, the Internet, and digital broadcasting.

In the computer, the program may be installed on the storage unit 1008 through the input/output interface 1005 by mounting the removable medium 1011 on the drive 1010. Also, the program may be received by the communication unit 1009 by means of the wired or wireless transmission medium to be installed on the storage unit 1008. In addition, the program may be installed in advance on the ROM 1002 and the storage unit 1008.

Meanwhile, the program executed by the computer may be the program of which processes are performed in chronological order in the order described in this specification or may be the program of which processes are performed in parallel or at required timing such as when a call is issued.

Also, in this specification, a system is intended to mean assembly of a plurality of components (devices, modules (parts) and the like) and it does not matter whether all the components are in the same casing. Therefore, a plurality of devices stored in different casings connected through the network and one device obtained by storing a plurality of modules in one casing are the systems.

Meanwhile, the embodiment of the present disclosure is not limited to the above-described embodiment, and various modifications may be made without departing from the gist of the present disclosure.

For example, the present technology may be configured as cloud computing in which a function is shared by a plurality of devices through the network to process together.

Also, each step described in the above-described flowchart may be executed by one device or executed by a plurality of devices in a shared manner.

Furthermore, in a case where a plurality of processes is included in one step, a plurality of processes included in one step may be executed by one device or by a plurality of devices in a shared manner.

Meanwhile, the present disclosure may also have the following configuration.

<1> An image processing device including:
a first imaging unit which captures an image;
a plurality of second imaging units capable of setting an imaging condition independent from the imaging condition of the first imaging unit;
a motion detection unit which detects a motion amount; and
an imaging control unit which determines the imaging condition of the first imaging unit and the imaging condition of the plurality of second imaging units,
in which the imaging control unit determines the imaging condition of the first imaging unit and the imaging condition of the plurality of second imaging units according to the motion amount detected by the motion detection unit.

<2> The image processing device according to <1>,
in which the first imaging unit and the plurality of second imaging units have configurations of image sensors and optical systems independent from each other or the configurations obtained by dividing the same optical system and pixels on the same image sensor into two or more groups.

<3> The image processing device according to <1> or <2>,
in which the first imaging unit and the plurality of second imaging units have different characteristics.

<4> The image processing device according to <3>,
in which the first imaging unit and the plurality of second imaging units have different characteristics in at least any one of array of a color filter array, an optical lens characteristic, a pixel size, and a sensor size.

<5> The image processing device according to any one of <1> to <4>,
in which exposure time which is the imaging condition of the first imaging unit is longest exposure time set on the basis of the motion amount and a motion limit threshold determined in advance.

<6> The image processing device according to <5>,
in which the exposure time which is the imaging condition of the first imaging unit is terminated at a timing at which the motion amount becomes larger than the motion limit threshold within the longest exposure time.

<7> The image processing device according to any one of <1> to <6>,
in which the imaging condition of the second imaging units is such that, in a case of capturing a still image, an exposure start timing is made the same as the exposure start timing in the first imaging unit, or an exposure finish timing is made the same as the exposure finish timing in the first imaging unit.

<8> The image processing device according to any one of <1> to <7>,
in which exposure time out of the imaging condition of the second imaging units is longest exposure time set on the basis of the motion amount and a motion limit threshold determined in advance.

<9> The image processing device according to any one of <1> to <8>,
in which the exposure time which is the imaging condition of the second imaging units is terminated at a timing at which the motion amount becomes larger than the motion limit threshold within the longest exposure time.

<10> The image processing device according to <8>,
in which the exposure time out of the imaging condition of the second imaging units is the exposure time set on the basis of an exposure time ratio with the exposure time in the first imaging unit in the longest exposure time.

<11> The image processing device according to any one of <1> to <10>,
in which exposure time out of the imaging condition of the second imaging units is such that longest exposure time is recalculated according to the exposure time until the exposure time is terminated in a case where the exposure time is terminated at a timing at which the motion amount becomes larger than a motion limit threshold within the longest exposure time set on the basis of the motion amount and the motion limit threshold determined in advance.

<12> The image processing device according to any one of <1> to <11>, in which the imaging condition of the second imaging units is a pixel addition mode in which pixel values of a plurality of surrounding pixels are added to be handled for each pixel in a case where appropriate exposure cannot be obtained with predetermined exposure time.

<13> The image processing device according to any one of <1> to <12>, in which the motion detection unit detects a motion amount of a camera by obtaining an angular or translational displacement amount by integrating angular velocity or acceleration information detected by a motion sensor including a gyro sensor or a six-axis sensor.

<14> The image processing device according to any one of <1> to <13>, in which the motion detection unit detects motion of the first imaging unit or the second imaging units or motion in accordance with motion of a subject in an image from two or more images captured by the first imaging unit or the second imaging units at different timings.

<15> The image processing device according to any one of <1> to <14>, further including:

a composition unit which composites an image captured by the first imaging unit and images captured by the plurality of second imaging units to generate a composite image.

<16> An image processing method of an image processing device including:

a first imaging unit which captures an image;

a plurality of second imaging units capable of setting an imaging condition independent from the imaging condition of the first imaging unit;

a motion detection unit which detects a motion amount; and an imaging control unit which determines the imaging condition of the first imaging unit and the imaging condition of the plurality of second imaging units, in which the imaging control unit determines the imaging condition of the first imaging unit and the imaging condition of the plurality of second imaging units according to the motion amount detected by the motion detection unit.

<17> A program allowing a computer to serve as:

a first imaging unit which captures an image;

a plurality of second imaging units capable of setting an imaging condition independent from the imaging condition of the first imaging unit;

a motion detection unit which detects a motion amount; and an imaging control unit which determines the imaging condition of the first imaging unit and the imaging condition of the plurality of second imaging units, in which the imaging control unit determines the imaging condition of the first imaging unit and the imaging condition of the plurality of second imaging units according to the motion amount detected by the motion detection unit.

REFERENCE SIGNS LIST

11 Image processing device
31 Basic imaging unit
32 Auxiliary imaging unit
33 Imaging control unit
33a Motion detection unit
41 Imaging control unit
41a Motion detection unit
51 Imaging control unit
51a Motion detection unit
71 Imaging control unit
71a Motion detection unit
91 Imaging control unit
91a Motion detection unit

The invention claimed is:

1. An image processing device, comprising:
a motion detection unit configured to detect a first motion amount;
an imaging control unit configured to determine each of a first imaging condition and a second imaging condition based on the detected first motion amount;
a first imaging unit configured to:
capture a first image, wherein the first imaging condition is associated with the first imaging unit; and
set a first exposure time based on the detected first motion amount and a motion limit threshold, wherein
the first imaging condition is associated with the first exposure time, and
the first exposure time is a specific exposure time; and
a plurality of second imaging units configured to set the second imaging condition, wherein the second imaging condition is independent from the first imaging condition.

2. The image processing device according to claim 1, wherein
each of the first imaging unit and the plurality of second imaging units comprises one of;
a first plurality of configurations of image sensors and optical systems or
a second plurality of configurations of a plurality of groups;
the plurality of groups is based on a division of the image sensors and the optical systems, and
each of the first plurality of configurations is independent.

3. The image processing device according to claim 1, wherein characteristics of the first imaging unit is different from characteristics of each of the plurality of second imaging units.

4. The image processing device according to claim 3, wherein the characteristics of the first imaging unit is different from the characteristics of each of the plurality of second imaging units based on at least one of an array of a color filter array, an optical lens characteristic, a pixel size, or a sensor size.

5. The image processing device according to claim 1, wherein
the first exposure time elapses at a specific time, and
the specific time is based on the detected first motion amount that is larger than the motion limit threshold.

6. The image processing device according to claim 1, wherein
the first imaging condition is associated with a first exposure start time and a first exposure finish time,
the second imaging condition is associated with a second exposure start time and a second exposure finish time, and
the plurality of second imaging units is further configured to set one of the second exposure start time equal to the first exposure start time, or the second exposure finish time equal to the first exposure finish time.

7. The image processing device according to claim 1, wherein the second imaging condition is a pixel addition mode,
the plurality of second imaging units is further configured to add pixel values of a plurality of surrounding pixels for each pixel of the captured first image in the pixel addition mode,
the pixel values are added based on an exposure value that is smaller than a specific exposure value, and
the exposure value corresponds to the specific exposure time.

8. The image processing device according to claim 1, wherein
the motion detection unit is further configured to:
calculate at least one of an angular displacement amount or a translational displacement amount; and
detect a second motion amount of a camera based on the at least one of the angular displacement amount or the translational displacement amount, and
the motion detection unit comprises at least one of a gyro sensor or a six-axis sensor.

9. The image processing device according to claim 1, wherein
the motion detection unit is further configured to detect motion based on at least one of
motion of at least one of the first imaging unit or the plurality of second imaging units, or
motion of a subject in a specific image of a plurality of second images,
the plurality of second images corresponds to one of the first imaging unit or the plurality of second imaging units, and
each of the plurality of second images is associated with a different time.

10. The image processing device according to claim 1, further comprising:
a composition unit configured to generate a composite image, wherein
the plurality of second imaging units is further configured to capture a plurality of second images, and
the generated composite image is a combination of the captured first image and the captured plurality of second images.

11. An image processing device, comprising:
a motion detection unit configured to detect a motion amount;
an imaging control unit configured to determine each of a first imaging condition and a second imaging condition based on the detected motion amount;
a first imaging unit configured to capture an image, wherein the first imaging condition is associated with the first imaging unit; and
a plurality of second imaging units configured to:
set the second imaging condition, wherein the second imaging condition is independent from the first imaging condition; and
set a exposure time based on the detected motion amount and a motion limit threshold, wherein
the second imaging condition is associated with the exposure time, and
the exposure time is a specific exposure time.

12. The image processing device according to claim 11, wherein the
exposure time elapses at a specific time, and
the specific time is based on the detected motion amount that is larger than the motion limit threshold.

13. The image processing device according to claim 11, wherein the plurality of second imaging units is further configured to set the exposure time based on an exposure time ratio, and
the exposure time ratio comprises an exposure time associated with the first imaging unit.

14. An image processing device, comprising:
a motion detection unit configured to detect a motion amount;
an imaging control unit configured to determine each of a first imaging condition and a second imaging condition based on the detected motion amount;
a first imaging unit configured to capture an image, wherein the first imaging condition is associated with the first imaging unit;
a plurality of second imaging units configured to:
set the second imaging condition, wherein
the second imaging condition is independent from the first imaging condition,
the second imaging condition is associated with an exposure time, and
the exposure time is a specific exposure time, wherein the specific exposure time is based on the detected motion amount and a motion limit threshold determined; and
calculate the specific exposure time based on the exposure time that is elapsed at a time at which the detected motion amount is larger than the motion limit threshold.

15. An image processing method, comprising:
in an image processing device:
capturing an image;
detecting a motion amount; and
determining each of a first imaging condition of a first imaging unit and a second imaging condition of a plurality of second imaging units based on the detected motion amount;
setting an exposure time based on the detected motion amount and a motion limit threshold, wherein
the first imaging condition is associated with the exposure time, and
the exposure time is a specific exposure time; and
setting the second imaging condition for the plurality of second imaging units, wherein the second imaging condition is independent from the first imaging condition.

16. A non-transitory computer-readable medium having stored thereon, computer-executable instructions which, when executed by a computer, cause the computer to execute operations, the operations comprising:
capturing an image;
detecting a motion amount; and
determining each of a first imaging condition of a first imaging unit and a second imaging condition of a plurality of second imaging units based on the detected motion amount;
setting an exposure time based on the detected motion amount and a motion limit threshold, wherein
the first imaging condition is associated with the exposure time, and
the exposure time is a specific exposure time; and
setting the second imaging condition for the plurality of second imaging units, wherein the second imaging condition is independent from the first imaging condition.

17. An image processing device, comprising:
a motion detection unit configured to detect a motion amount;

an imaging control unit configured to determine each of a first imaging condition and a second imaging condition based on the detected motion amount;

a first imaging unit configured to capture an image, wherein
- the first imaging condition is associated with the first imaging unit, and
- the first imaging condition is further associated with a first exposure start time and a first exposure finish time;

a plurality of second imaging units configured to:
- set the second imaging condition, wherein
  - the second imaging condition is independent from the first imaging condition, and
  - the second imaging condition is associated with a second exposure start time and a second exposure finish time; and
- set one of the second exposure start time equal to the first exposure start time, or the second exposure finish time equal to the second exposure finish time based on the captured image being a still image.

18. An image processing device, comprising:

a motion detection unit configured to detect a motion amount;

an imaging control unit configured to determine each of a first imaging condition and a second imaging condition based on the detected motion amount;

a first imaging unit configured to:
- capture an image, wherein the first imaging condition is associated with the first imaging unit, a plurality of second imaging units configured to:
- set the second imaging condition, wherein
  - the second imaging condition is independent from the first imaging condition, and
  - the second imaging condition is a pixel addition mode; and
- add pixel values of a plurality of surrounding pixels for each pixel of the captured image in the pixel addition mode, wherein
  - the pixel values are added based on an exposure value that is smaller than a specific exposure value, and
  - the exposure value corresponds to a specific exposure time.

* * * * *